(12) United States Patent
Hiemstra et al.

(10) Patent No.: US 11,718,202 B2
(45) Date of Patent: Aug. 8, 2023

(54) BACK-REST PIVOT FITTING AND SEAT WITH FOLDING BACK-REST

(71) Applicant: Adient US LLC, Plymouth, MI (US)

(72) Inventors: Bruce A. Hiemstra, Ann Arbor, MI (US); Michael J. Leighton, LaSalle (CA); Yannis Poulos, Sylvania, OH (US); Diana Eblenkamp, Clarkston, MI (US); Miodrag M. Petrovic, Ann Arbor, MI (US); Falko Jähner, Bloomfield Hills, MI (US); Sandeep Devadkar, Pune (IN)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 17/606,102

(22) PCT Filed: Feb. 6, 2020

(86) PCT No.: PCT/EP2020/053003
§ 371 (c)(1),
(2) Date: Oct. 25, 2021

(87) PCT Pub. No.: WO2020/216483
PCT Pub. Date: Oct. 29, 2020

(65) Prior Publication Data
US 2022/0305958 A1    Sep. 29, 2022

Related U.S. Application Data

(60) Provisional application No. 62/838,951, filed on Apr. 26, 2019.

(51) Int. Cl.
*B60N 2/02* (2006.01)

(52) U.S. Cl.
CPC .... *B60N 2/0232* (2013.01); *B60N 2002/0236* (2013.01)

(58) Field of Classification Search
CPC .................. B60N 2/0232; B60N 2002/0236
USPC ..................................... 297/354.12
See application file for complete search history.

(56) References Cited

U.S. PATENT DOCUMENTS

| | | | |
|---|---|---|---|
| 6,402,249 B1* | 6/2002 | Rohee | B60N 2/20 297/378.12 |
| 11,427,110 B2* | 8/2022 | Leighton | B60N 2/22 |
| 2005/0184549 A1 | 8/2005 | Robinson et al. | |
| 2006/0152058 A1* | 7/2006 | Pejathaya | B60N 2/0232 297/378.12 |
| 2017/0341536 A1 | 11/2017 | Uno et al. | |

FOREIGN PATENT DOCUMENTS

| | | |
|---|---|---|
| DE | 102008047671 A1 | 4/2010 |
| DE | 102017209330 A1 | 12/2018 |

OTHER PUBLICATIONS

European Patent Office, International Search Report and Written Opinion in Application No. PCT/EP2020/053003, dated Apr. 28, 2020, 10 pages, Rijswijk, Netherlands.

* cited by examiner

*Primary Examiner* — Mark R Wendell
(74) *Attorney, Agent, or Firm* — Marshall & Melhorn, LLC

(57) ABSTRACT

A back-rest pivot fitting for a seat, having at least a seat pan, a folding back-rest, which is pivotable coupled to the seat pan, and a pivot fitting. The pivot fitting may have at least a first fitting member which is fixed to the seat pan, a second fitting member, which is pivotable coupled to the first fitting member and which is fixed to the back-rest, a recliner heart and an adjustment member.

12 Claims, 31 Drawing Sheets

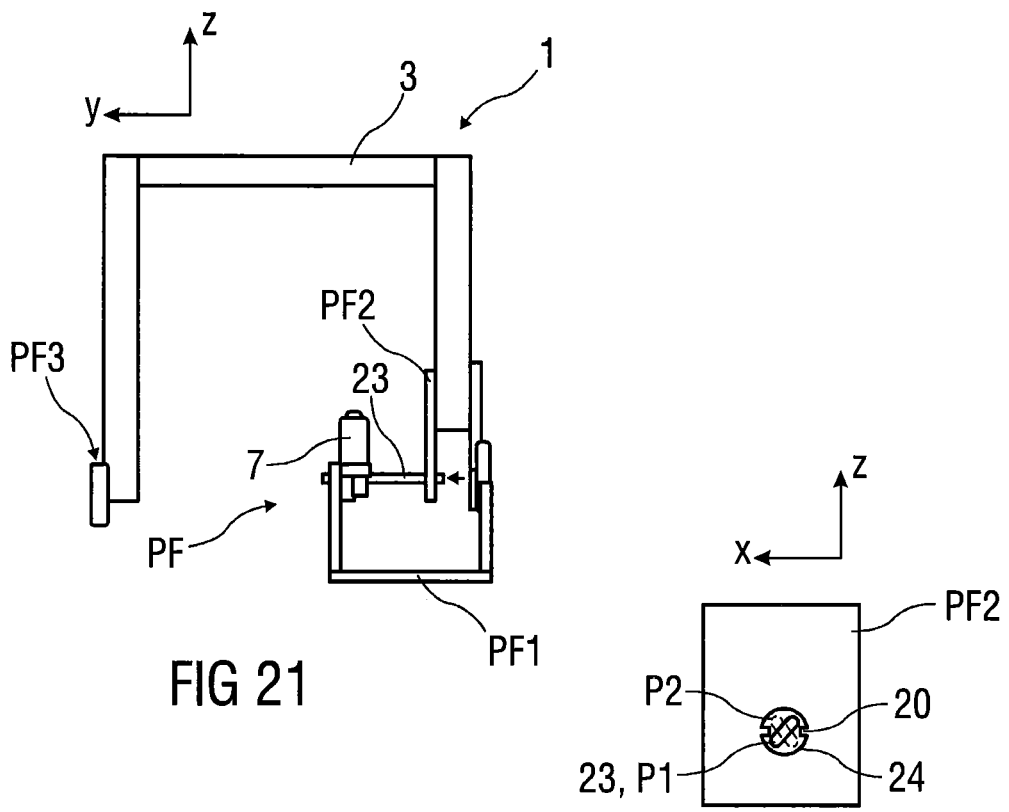
FIG 21
FIG 22
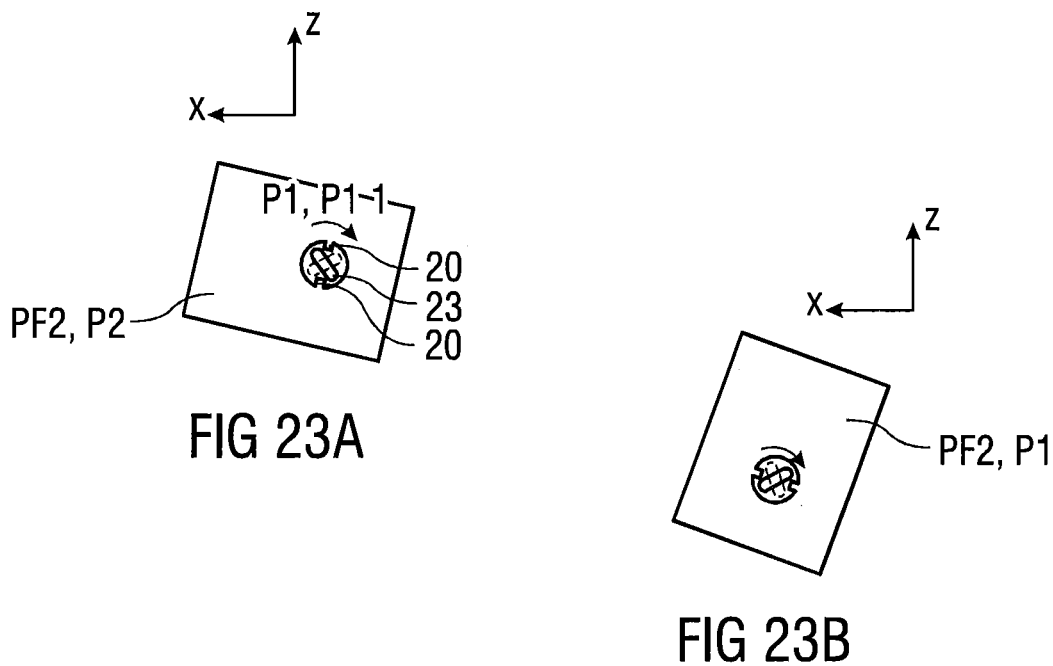
FIG 23A
FIG 23B

BACK-REST PIVOT FITTING AND SEAT WITH FOLDING BACK-REST

BACKGROUND OF THE DISCLOSURE

The present disclosure relates generally to a back-rest pivot fitting for a seat, in particular vehicle seat, and to a seat for a vehicle with a folding back-rest and such a pivot fitting.

In the prior art, various seat adjusters with fittings for manual or electrically operated adjustment of a back-rest of a vehicle seat are known, for example, having a folding back-rest to increase a vehicle tail load space.

SUMMARY OF THE DISCLOSURE

It is an object of the present disclosure to provide an improved back-rest pivot fitting which is substantially lightweight and provides a compact design. In particular, only one actuator mechanism is needed to provide a powered adjustment of the seat. Further, it is an object of the present disclosure to provide an improved seat for a vehicle and an improved pivot fitting for adjusting a back-rest of the seat. In particular, the invention refers to a comparatively low cost and low mass seat having an improved pivot fitting, particularly a pivot system, such as a recliner system, which is compatible with manual seat systems with total integration whilst offering commonality. For example, the pivot fitting is designed as a simple add-on module.

According to the disclosure, the object of a back-rest pivot fitting for a seat is solved by the features claimed in the claims. Further, according to the disclosure, the object of a seat is solved by the features claimed in the claims claim.

According to the disclosure, a seat for a vehicle, comprising at least a seat pan, a folding back-rest which is pivotable coupled to the seat pan, a pivot fitting for adjusting a pivoting of the back-rest relative to the seat pan between at least an upright use position and at least a non-use position, the pivot fitting comprising a first fitting member which is fixed to the seat pan and a second fitting member which is pivotable coupled to the first fitting member and which is fixed to the back-rest. Further, the pivot fitting comprises an adjustment member comprising a toothed segment, wherein the adjustment member is rotatable coupled to the first and second fitting members. Moreover, the pivot fitting comprises a recliner heart and a drive unit which is fixedly mounted to the first fitting member and configured to drive the adjustment member, for example about a pivot axis, wherein the recliner heart, when actuated, is configured to allow an unimpeded motion of the second fitting member relative to the first fitting member from the upright use position, to any possible lock position and to the non-use position, and the adjustment member, in particular its toothed segment, is configured to interact with the drive unit such that, when the drive unit is actuated, the second fitting member is moved from the non-use position to the upright use position or such as a first lock position. The recliner heart provides a dwell zone. In particular, the recliner heart is configured to allow an unimpeded motion in form of a free pivot motion. The recliner heart comprises a number of recliner components. Particularly, the recliner heart comprises a free swing gate, wherein actuation of the recliner heart actuates the free swing gate to allow the unimpeded motion of the movable fitting member relative to the stationary fitting member. For example, the free pivot motion is carried out without any rattling or any other feeling of obstruction. The pivot motion into the non-use position may be supported manually or by means of a spring element.

For example, the seat is arranged in a rear row of the vehicle. By folding the back-rest into the non-use position, a load space/cargo space of the vehicle can be increased. Particularly, in the non-use position of the back-rest, the back-rest is arranged on the seat pan such that a rear side of the back-rest provides a substantially horizontal storage space. Furthermore, the back-rest can be folded into a floor of the vehicle to provide a flat tail load space. Particularly, the non-use position is a fully stowed position of the back-rest. The upright use position is at least one of an upright position in which the back-rest is locked relative to the seat pan. Thereby, the pivot fitting is locked such that the back-rest, particularly the second fitting member, is disabled to pivot relatively to the seat pan, particularly the first fitting member. The pivot fitting comprises a recliner mechanism, such as a rotary recliner mechanism. In particular, the pivot fitting comprises the recliner heart as part of the recliner mechanism. The recliner heart is also commonly referred to as recliner.

Such rotary recliner mechanism is carefully designed to meet current safety requirements while also limiting the amount of slack or play that can be perceived by a seat occupant. As a result, prior art recliner mechanisms and pivot fittings tend to be heavily constructed items in order to withstand certain load conditions and as such, add significantly to the overall vehicle weight.

The invention refers to an improved, comparatively low cost and low mass pivot fitting and recliner mechanism. In particular, the pivot fitting and a functionality of the pivot fitting are designed such that a high stow speed and lift speed of the back-rest relative to the seat pan and/or a floor can be achieved. The pivot fitting is configured to provide a rear row recliner mechanism for a vehicle that allows the back-rest to be released, dumped and stowed in a quick manner as well as to be brought back and locked in the upright use position in a quick manner. For instance, the pivot fitting is configured as a dual sided recliner mechanism. For example, the pivot fitting comprises one of a manual recliner mechanism and a powered lifting mechanism. The drive unit is a motor unit. Furthermore, folding of the back-rest to a stowed and loading space enlarging position may be carried out manually or automatically and adjusting the back-rest back from the stowed position to an upright locked position may be carried out automatically or manually. Moreover, a seat may comprise a recliner on one side and a free pivot on the other side.

According to one embodiment, the pivot fitting comprises a spring element, such as a return spring, which, once the pivot fitting is released, is configured to move the back-rest into the non-use position. For example, the return spring is in a tensed state when the pivot fitting is locked in the upright use position of the back-rest. Upon releasing the pivot fitting, wherein the second fitting member is enabled to pivot relatively to the first fitting member, the return spring is configured to relax pushing the back-rest into the non-use position. The spring element is coupled to the second fitting member. For instance, the spring element is biased between the first and second fitting members. The movement of the back-rest may be caused by the spring element in a self-acting manner. In combination with a manual stowing by a user, the spring element is configured to support a user's force for moving the back-rest into the non-use position.

In another embodiment, the back-rest is configured to be manually moved from the upright use position to the non-use position. Upon releasing the pivot fitting, wherein the second fitting member is enabled to pivot relatively to the first fitting member, the back-rest can be moved, in particular is released to be moved, by a user. In particular, the second fitting member is configured to be freely pivotable relative to the first fitting member.

According to a further embodiment, the pivot fitting comprises a lock mechanism. In particular, the lock mechanism is configured to lock the second fitting member and the first fitting member in the upright use position. The lock mechanism disables a pivoting of the second fitting member relative to the first fitting member. For instance, when the lock mechanism is in a locked state, the second fitting member and the first fitting member are fixedly engaged with each other. When the lock mechanism is in a released state, the second fitting member and the first fitting member are substantially disengaged from each other.

Moreover, the pivot fitting comprises a release mechanism configured to release the pivot fitting such that the second fitting member is enabled to be pivoted relative to the first fitting member. The release mechanism comprises at least a release lever which releases, particularly unlocks, the lock mechanism. In particular, the release lever is configured to release and unlock the second fitting member from the first fitting member. For example, the release mechanism is coupled to the lock mechanism.

In another embodiment, the release mechanism comprises a switch element, such as an electric switch, in particular a micro switch. The switch element is arranged in a range of the release lever such that when the release lever is actuated, the release lever comes in contact with the switch element. For example, the switch element is coupled to the lock mechanism. When the release lever is actuated, the release lever actuates the switch element when the lock mechanism is released. The release lever is formed as a pivotable actuation element. The release lever comprises a contacting area which is configured to actuate the switch element. Upon releasing the release lever, the release lever rotates around a pivot axis in a release direction, wherein the contacting area comes into contact with the switch element, in particular with a tipping-point of the switch element. The switch element will then transmit a signal to a control unit, such as an electronic control unit, that the pivot fitting is unlocked. When the second fitting member is moved back into the upright use position, the release lever rotates in an opposite direction of the release direction, wherein the switch element, in particular its tipping-point, is set free from the contacting area. Signal detection is then disconnected. When the back-rest is moved back into the upright use position, the back-rest will be locked in the upright use position. In particular, the lock mechanism is configured to lock self-acting.

In a further embodiment, the release mechanism is coupled to a manual operation device. The manual operation device is arranged in a cargo area of the vehicle. Optionally, the manual operation device is arranged on a seat component, for example on a back-rest structure. For example, the manual operation device can comprise an operation button which can be actuated by a user. The operation button can be actuated by the user to actuate the release mechanism of the pivot fitting. For example, the operation button is electrically coupled to the drive unit, wherein upon operating the button, the drive unit is powered and releases the back-rest pivot fitting and/or returns the seat from the stowed position. Additionally or optionally, the button is coupled to the release mechanism, for example to the release lever via a Bowden cable. For example, upon operating the manual operation device the drive unit is powered at least to lift the back-rest. Operating the operation device when the back-rest is in the non-use position leads to activating the drive unit to move the back-rest.

According to an embodiment, the release mechanism can be one of a manual or powered release. Further, a combination of a manual and powered release is possible.

For example, it is possible to manually release the back-rest to move or to be enabled to move to the non-use position. The manual release can be actuated via a handle, for example arranged on the back-rest. The handle may be coupled to the release lever. For instance, the handle is connected to the release lever via a Bowden cable. An electrical switch may be provided on the back-rest or in the cargo area, wherein by activating the electrical switch, the back-rest is powered back up to the upright position. The electrical switch is e.g. an operation device.

In a further variant, it is possible to push the electrical switch to actuate the drive unit which opens the recliner/s, wherein the back-rest stows by force of at least one spring element. Pushing the electrical switch again, the drive unit powers the back-rest back to the upright use position. For example, the manual release can be actuated via the electrical switch arranged on the back-rest or in the cargo area. The release lever is connected to recliner/s via the drive unit. The drive unit may be coupled to the release lever. By pushing the electrical switch, the drive unit actuates release of the recliner/s and the back-rest may be stowed manually or automatically by spring force. In other words: the electrical switch is configured upon actuation to turn the drive unit "on". The drive unit is powered to release the recliner/s and/or return the back-rest from stow.

The upright use position is at least one of a first lock position of the back-rest. A further upright use position is at least one of an upright design position. In particular, the first lock position and the upright design position differ from each other and can each be one of a different position than a further comfort use position. For example, when the pivot fitting is locked in upright use position, particularly in the first lock position, the back-rest can be enabled to pivot into a further upright design position and/or comfort use position.

According to an embodiment, the pivot fitting is coupled to an additional handle actuation mechanism. When the back-rest is locked in the upright use position, i.e. in the first lock position, the back-rest can be enabled to be further pivoted and locked in an upright design position and/or comfort use position.

The upright design position is, for example, a position in which the back-rest is angled about 3° to 20°, in particular about 17°, with respect to a vertical axis. In particular, the back-rest can be pivoted about up to 14° from the first lock position in a direction away from a seat occupant. The first lock position defines a position in which the back-rest is angled about 3° to 5° with respect to the vertical axis. In a further embodiment, the back-rest can be pivoted about up to 10° more from the upright design position to a comfort use position to increase comfort for the seat occupant. From the upright design position the back-rest is able to be pivoted about a stow angle up to 110°, for example 105°, towards the seat pan and/or a vehicle floor.

According to an embodiment, the drive unit comprises a drivable pinion which is coupled to the toothed segment of the adjustment member.

The adjustment member is a sector or segment unit. The adjustment member is configured as a circular plate. For instance, the adjustment member is a disc having at least two different outer surface areas, wherein one of the surface areas is a substantially smooth area or a cut-out area for packaging and the other one is a toothed area. The toothed area provides a step-wise or continuously step-wise and substantially precise return adjustment motion of the back-rest. The adjustment member is partitioned into at least two segments which are configured to provide a mechanism allowing an easy adjustment of the back-rest, i.e. the second fitting member, from the upright use position, such as the upright design position, to the non-use position and from the non-use position to the upright use position, such as the first lock position. The toothed segment is configured to interact with the drive unit, particular with the pinion driven by the drive unit. A free swing segment is also configured to allow an unimpeded, free pivot motion of the second fitting member when the second fitting member is released to be pivoted about a pivot axis relative to the first fitting member. The free swing segment is, for example, a plane circular shaped segment on a surface of the adjustment member, wherein the toothed segment is shaped on the same surface of the adjustment member. The free swing segment is not in engagement with any component of the adjustment member. The free swing segment is configured to enable a smooth and unhindered pivoting of the second fitting member relative to the first fitting member about a pivot axis. A user of the vehicle can pivot the back-rest relative to the seat pan manually, for example by pushing the back-rest towards the seat pan. Optionally or additionally the pivot movement of the back-rest is supported by means of a spring element.

In an embodiment, the free swing segment is shaped over a semicircular portion on the surface of the adjustment member. In particular, the free swing segment comprises an extending dimension over the surface of the adjustment member that the back-rest is enabled to be moved about up to 110°, for example 105°.

In another embodiment, the free swing segment is shaped over a quadrant portion of the adjustment member. The toothed segment is shaped over a semicircular portion on the surface of the adjustment member. In particular, the toothed segment extends over a portion of the adjustment member such that the second fitting member (and so as the back-rest) is pivotable about more than 90°. Particularly, the toothed segment comprises an extending dimension over the surface of the adjustment member that the back-rest is enabled to be moved about up to 110°, for example 105°.

According to another embodiment, wherein when the back-rest is positioned in the upright use position and the pivot fitting is in a locked state, the adjustment member is positioned in an initial (home) position. In the initial position, also a so called home position, the adjustment member is positioned such that the free swing segment, such as a dwell zone, is positioned oriented substantially upwards. For example, the free swing segment defines a pivot area about or along which the second fitting member is movable, particularly pivotable. In particular, the adjustment member is coupled to the second fitting member such that the second fitting member is unimpeded movable from the upright use position to the non-use position, wherein the second fitting member is locked to the adjustment member when reaching the non-use position such that the second fitting member is moved about the pivot axis when the adjustment member rotates about the pivot axis. Therefore, the drive unit, particularly the pinion, is in drivable engagement with the toothed segment of the adjustment member. Further, the toothed segment is positioned oriented rearward of a back-rest folding direction. Actuation of the drive unit causes an actuation of the pinion and so as the adjustment member which is engaged with the pinion. Thereby, the adjustment member is rotated about the pivot axis in a substantially downward and substantially front direction towards the folding direction of the back-rest to automatically fold up the back-rest.

In another embodiment, wherein upon releasing the second fitting member to be pivoted from the upright use position to the non-use position the adjustment member is configured to remain in the initial position, wherein when actuating the drive unit the adjustment member is configured to be driven from the initial position to a second position to actively adjust the second fitting member from the non-use position to the upright use position.

In another embodiment, wherein, when the second fitting member is moved from the non-use position to the upright use position and locked in the upright use position, the drive unit is configured to drive the adjustment member back to the initial position. In particular, once the second fitting member returns into the upright use position, the adjustment member is powered to move back from the second position, such as a travel position, to the initial position. The adjustment member is reset to allow occurring of another actuation sequence again.

In a further embodiment, the second fitting member comprises a lift bracket to be contacted by the adjustment member when adjusting the second fitting member from the non-use position to the upright use position. The lift bracket is mounted to the second fitting member. The lift bracket is configured to protrude from the second fitting member over the adjustment member, particularly over a width of the adjustment member. For instance, the lift bracket is configured as a flap, tab and/or end stop.

According to another further embodiment, the lift bracket is arranged on a rear side of the second fitting member such that the lift bracket moves along the free swing segment of the adjustment member when the second fitting member is moved from the upright use position to the non-use position. Due to the free swing segment the lift bracket is enabled to run over the free swing segment in an unimpeded motion.

According to an embodiment, the adjustment member comprises a stop element which, when the drive unit is actuated, comes in contact with the lift bracket to push the second fitting member from the non-use position to the upright use position. The stop element is arranged on a front side of the adjustment member positioned in the initial position. The stop element is either an additional part which is coupled to the adjustment member using one of a form-fit, bonding and/or force-fit. Optionally, the stop element and the adjustment member are configured as a one-piece part, such as a moulded part. In particular, the lift bracket moves towards the stop element along the free swing segment of the adjustment member when the second fitting member is moved from the upright use position to the non-use position. When the adjustment member is rotated substantially in a downward direction, the stop element is rotated towards the lift bracket to push it in an opposite direction of the folding direction to bring back the second fitting member, so as the back-rest, into the upright use position.

In another embodiment, the pivot fitting is coupled to an electronic control unit. The electronic control unit (ECU) is configured to at least control the lock mechanism and the drive unit.

The disclosure further relates to a back-rest pivot fitting for a seat for a vehicle, the seat comprising at least a seat pan, a folding back-rest which is pivotable coupled to the seat pan, a pivot fitting for adjusting a pivoting of the back-rest relative to the seat pan between at least an upright use position and at least a non-use position, the pivot fitting comprising a first fitting member which is fixed to the seat pan, a second fitting member which is pivotable coupled to the first fitting member and which is fixed to the back-rest, a recliner heart, an adjustment member comprising a toothed segment and which is rotatable coupled to the first and second fitting members, and a drive unit which is fixedly mounted to the second fitting member and configured to adjust the second fitting member about a pivot axis, wherein the recliner heart, when actuated, is configured to allow an unimpeded motion of the second fitting member and the drive unit relative to the first fitting member from the upright use position to the non-use position, wherein, when actuating the drive unit, the drive unit is configured to move along the toothed segment of the adjustment member to adjust the second fitting member from the non-use position to the upright use position.

According to an embodiment, the drive unit comprises a drivable pinion which is coupled to the toothed segment of the adjustment member.

According to an embodiment, wherein upon releasing the second fitting member to be pivoted from the upright use position to the non-use position the adjustment member is configured to rotate with the second fitting member such that an orientation of the toothed segment of the adjustment member remains relative to the drive unit.

According to another embodiment, wherein when the back-rest is positioned in the upright use position and the pivot fitting is in a locked state, the adjustment member is positioned in an initial position.

In another embodiment, wherein, when the second fitting member is moved from the non-use position to the upright use position and locked in the upright use position, the drive unit is configured to drive the adjustment member back to the initial position.

In a further aspect, a seat for a vehicle comprises at least a seat pan, a folding back-rest which is pivotable coupled to the seat pan, a pivot fitting for adjusting a pivoting of the back-rest relative to the seat pan between at least an upright use position and at least a non-use position, and a back-rest pivot fitting for adjusting a pivoting of the back-rest relative to the seat pan between at least an upright use position and at least a non-use position according to any embodiment described above.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein:

FIG. 21 shows schematically another embodiment of a pivot fitting, FIG. 22 shows schematically an embodiment of pivot fitting components of the pivot fitting according to FIG. 21, FIG. 23A shows schematically an embodiment of pivot fitting components of the pivot fitting according to FIG. 21, FIG. 23B shows schematically an embodiment of pivot fitting components of the pivot fitting according to FIG. 21, FIG. 23C shows schematically an embodiment of pivot fitting components of the pivot fitting according to FIG. 21.

Corresponding parts are marked with the same reference symbols in all figures.

DETAILED DESCRIPTION OF PREFERRED EMBODIMENTS

Figure 1:
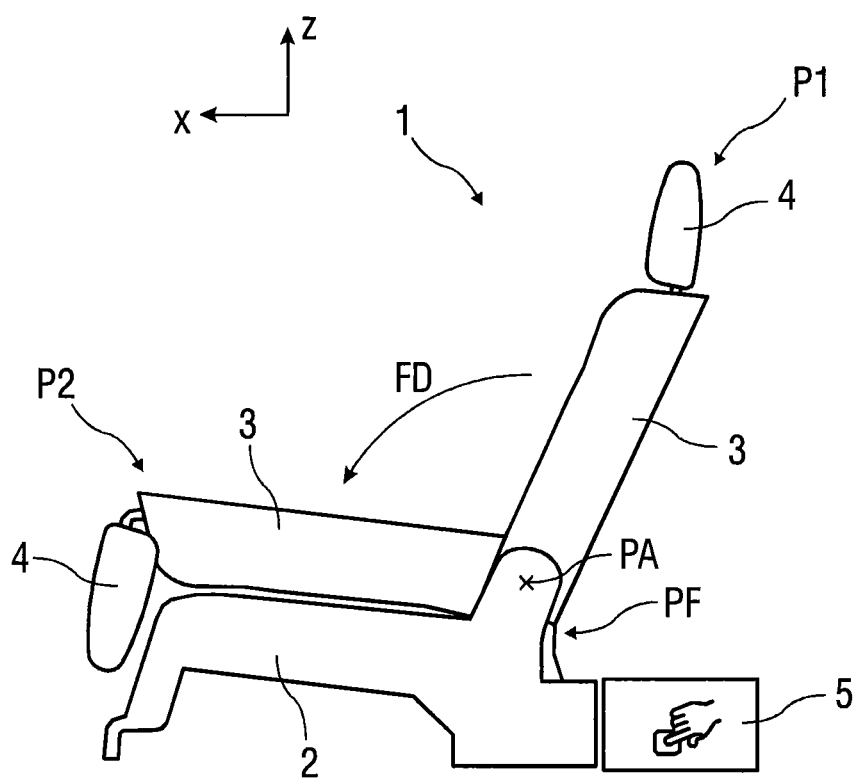
FIG. 1 shows a side view of an embodiment of a seat, in particular a vehicle seat, in different positions.

FIG. 1 shows a side view of an embodiment of a seat 1, in particular a vehicle seat, in different positions. The positions comprise at least one of an upright use position P1 and a non-use position P2.

For a better understanding of subsequent descriptions of the seat 1 a coordinate system is shown in further figures. The coordinate system comprises a longitudinal axis x, a transverse axis y and a vertical axis z in relation to the seat 1. Moreover, the seat 1 is one of a rear row seat, wherein, when the seat 1 is in the non-use position P2 a cargo space of a vehicle is increased.

The seat 1 comprises at least a seat pan 2 and a back-rest 3. Optionally additional, the seat 1 comprises a headrest 4. The back-rest 3 is adjustable relatively to the seat pan 2. In particular, the back-rest 3 is pivotable coupled to the seat pan 2 by at least one of a back-rest pivot fitting PF in a back-rest pivot axis PA. Further, the headrest 4 is adjustable relatively to the back-rest 3. The seat 1 is adjustable between the upright use position P1 and the non-use position P2. The upright use position P1 provides a seating surface to a seat occupant. For example, the upright use position P1 is one of a comfort seating position. The non-use position P2 is a position in which the back-rest 3 is folded down, particularly towards the seat pan 2, providing a substantially flat surface.

The pivot fitting PF is configured to adjust a pivoting of the seat 1, particularly of the back-rest 3, between the upright use position P1 and the non-use position P2. The pivot fitting PF is exemplarily configured as a continuously adjustable fitting. To actuate the pivot adjustment of the back-rest 3, a manual operation device 5 is arranged in the vehicle. For example, the operation device 5 is arranged in a rear region, such as a cargo area, of the vehicle. Alternatively or in addition, there may be a operation device 5 arranged in a front area of the vehicle, e. g. of a center console. Exemplarily, when a user operates the operation device 5 to enable a folding of the back-rest 3, a drive unit 7 can be actuated to open a lock mechanism LM of the back-rest 3. One embodiment of a lock mechanism LM is shown in FIGS. 15A to 15G. The back-rest 3 is released to be automatically moved to the non-use position P2, such as a folded condition, by means of a spring device or manually moved by the user. Further shown is a folding direction FD from the upright use position P1 to the non-use position P2. The headrest 4 can be moved into a stowed position by the user. In the upright use position P1 of the back-rest 3 the headrest 4 can be reset into a comfort position by the user.

Figure 2:
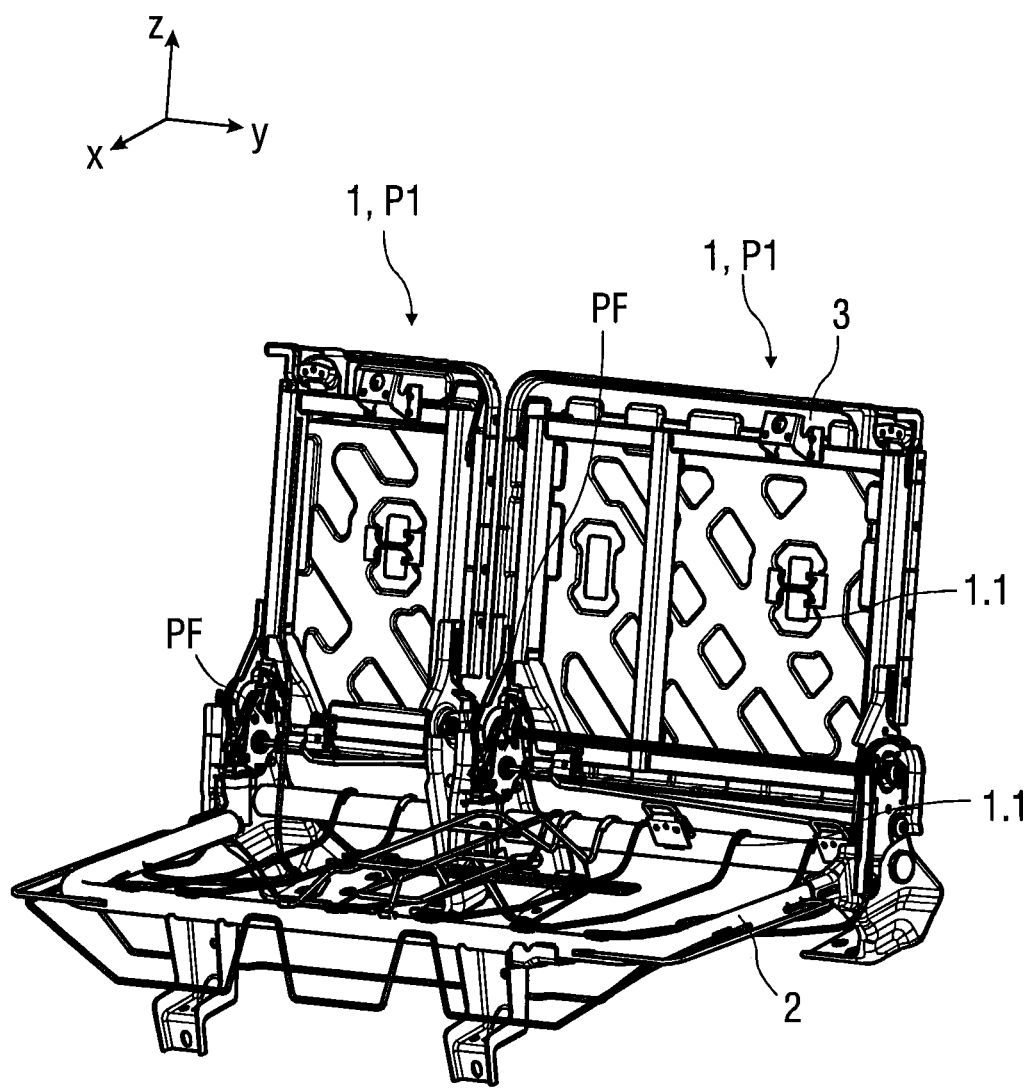
FIG. 2 shows a perspective view of an embodiment of a seat structure, in particular a rear row seat structure, for a vehicle.

FIG. 2 shows a perspective view of an embodiment of a seat structure 1.1, in particular a rear row seat structure, for a vehicle. A number of seats 1 can be arranged in a rear row of the vehicle, wherein each seat 1, such as a single seat or a bench, comprises a pivot fitting PF. The seat structure 1.1 comprises at least a seat pan frame and a back-rest frame. In particular, the pivot fitting PF is configured to be installed at structure level.

Figure 3:
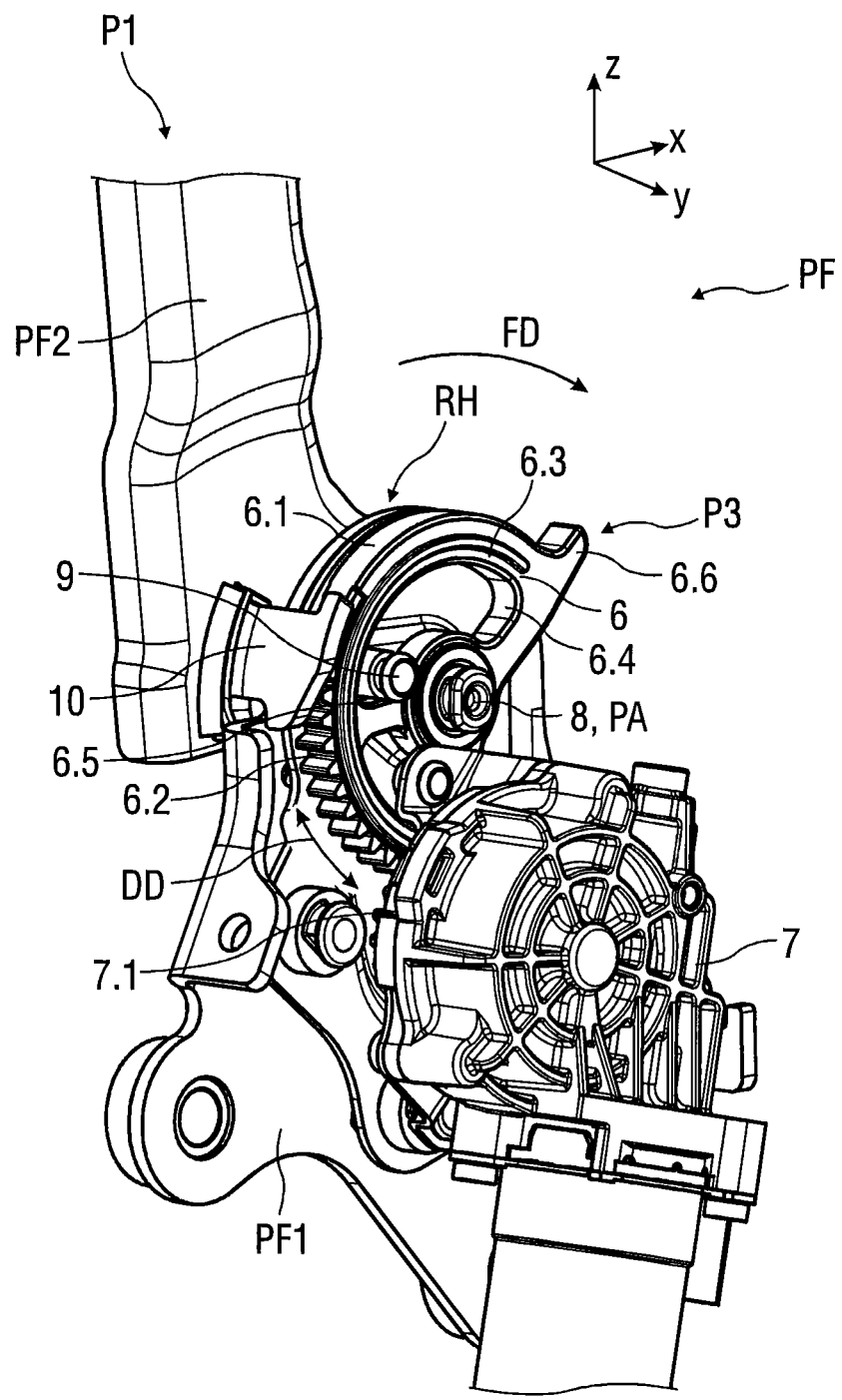
FIG. 3 shows a perspective view of an embodiment of a pivot fitting for adjusting a pivoting of a back-rest relative to a seat pan, wherein the pivot fitting comprises at least first and second fitting members, an adjustment member, wherein the adjustment member is shown in an initial position, and a drive unit.
Figure 9A:
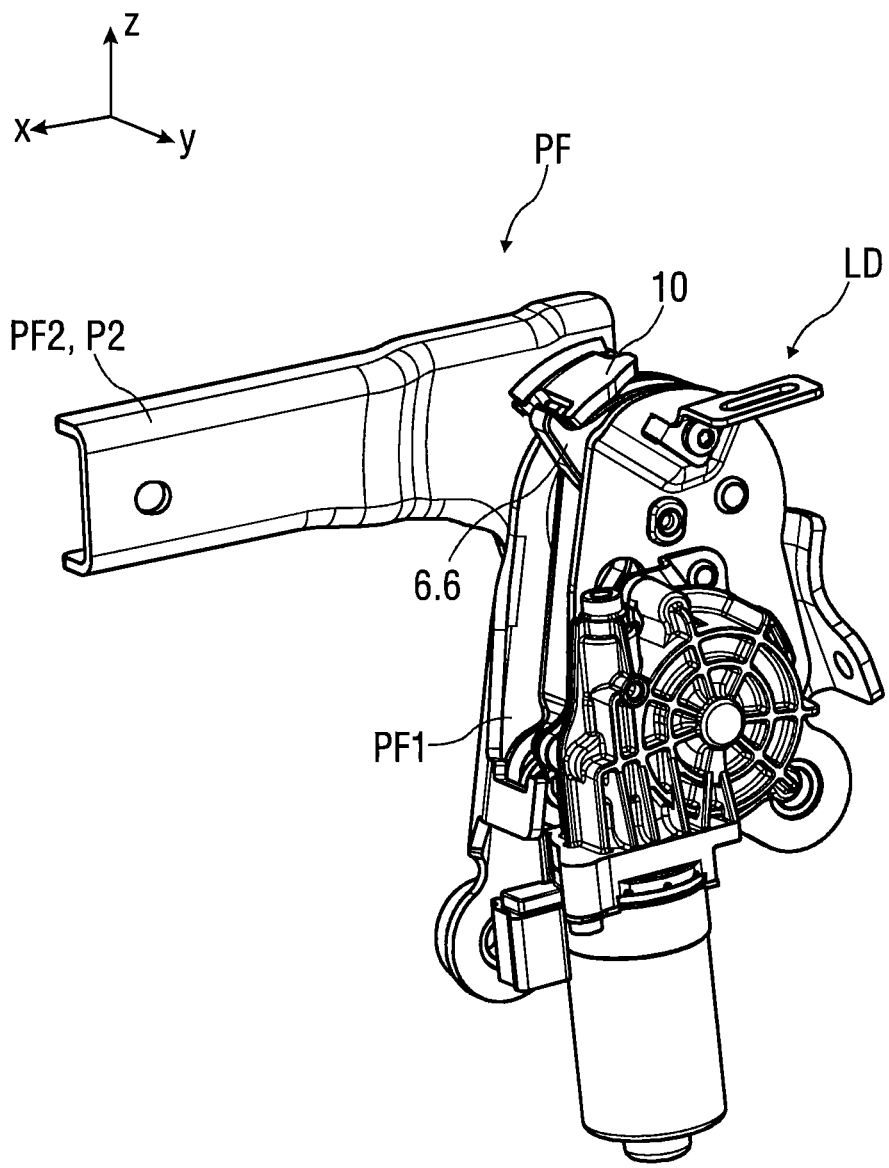
FIG. 9A shows a perspective view of an embodiment of a pivot fitting and a lift device in a non-use position of the back-rest.
Figure 9B:
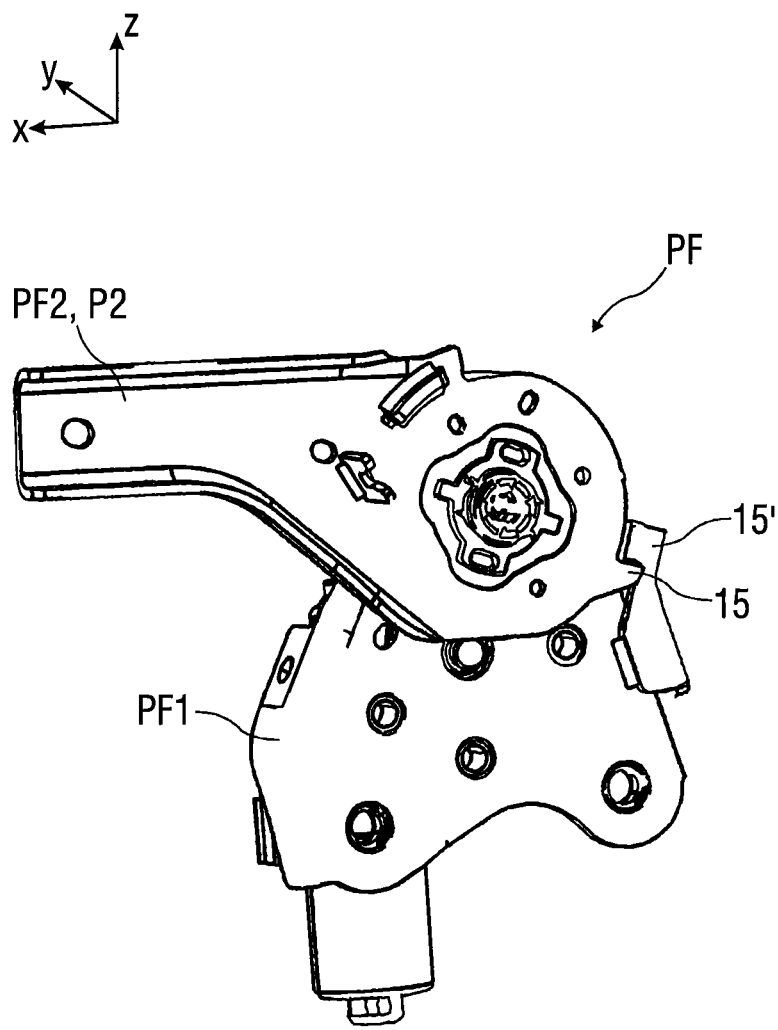
FIG. 9B shows a perspective view of an embodiment of a pivot fitting and a lift device in a non-use position of the back-rest.

FIG. 3 shows a perspective view of an embodiment of a pivot fitting PF for adjusting a pivoting of a back-rest 3 relative to a seat pan 2, wherein the pivot fitting PF comprises at least first and second fitting members PF1, PF2, an adjustment member 6 and a drive unit 7, wherein the adjustment member 6 is shown in an initial position P3. The first fitting member PF1 is fixed to the seat pan 2. The second fitting member PF2 is pivotable coupled to the first fitting member PF1 and fixed to the back-rest 3. A movement of the second fitting member PF2 relative to the first fitting member PF1 corresponds to a movement of the back-rest 3 relative to the seat pan 2. The adjustment member 6 comprising a free swing segment 6.1 and a toothed segment 6.2, wherein the adjustment member 6 is rotatable coupled to the first and second fitting members PF1, PF2. The drive unit 7 is fixedly mounted to the first fitting member PF1 and configured to drive the adjustment member 6 about the pivot axis PA. The drive unit 7 comprises a drivable pinion 7.1 which is coupled to the toothed segment 6.2 of the adjustment member 6. For example, the free swing segment 6.1 is configured to allow an unimpeded motion of the second fitting member PF2 relative to the first fitting member PF1 from the upright use position P1 to the non-use position P2. The toothed segment 6.2 is configured to interact with the drive unit 7 such that, when the drive unit 7 is actuated, the second fitting member PF2 is moved from the non-use position P2 to the upright use position P1. In particular, the non-use position P2 of the second fitting member PF2 is shown in FIGS. 9A and 9B.

Figure 12A:
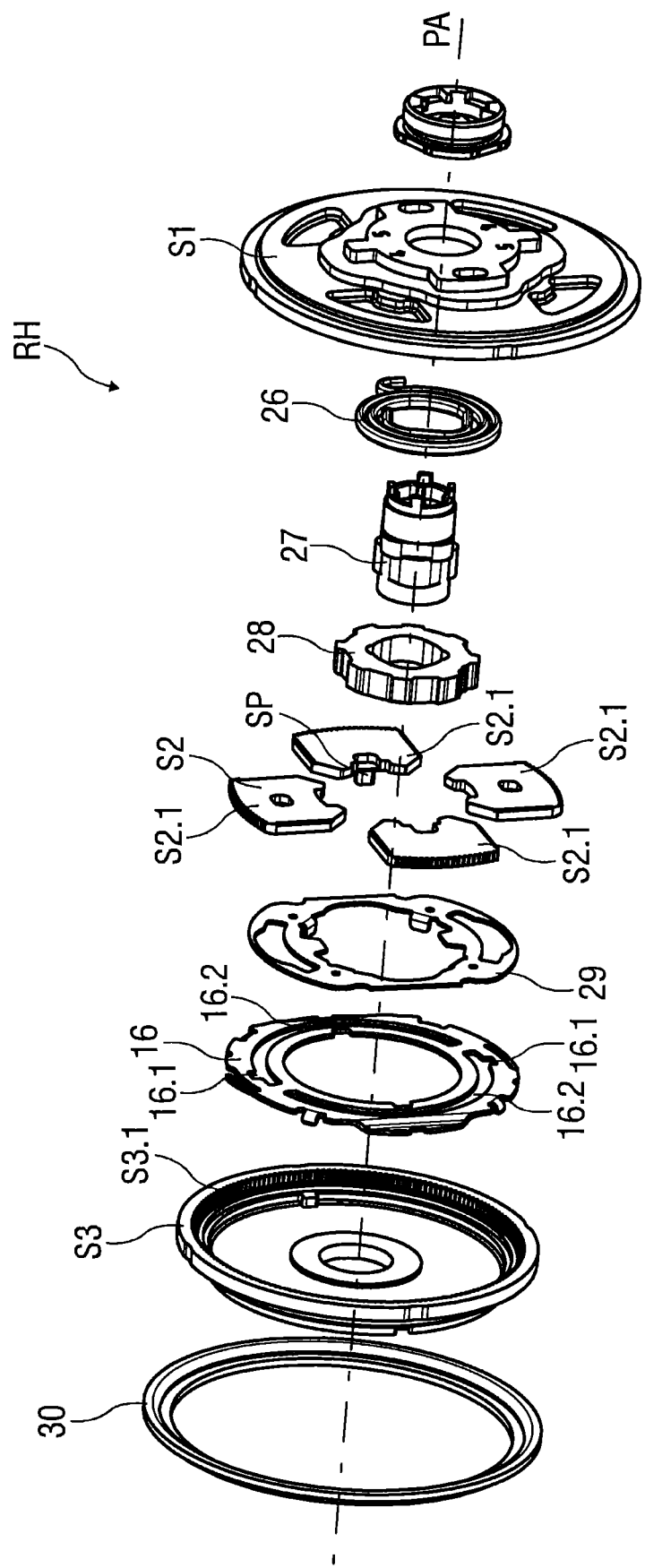
FIG. 12A shows an exploded view of the pivot fitting comprising a recliner heart.
Figure 12B:
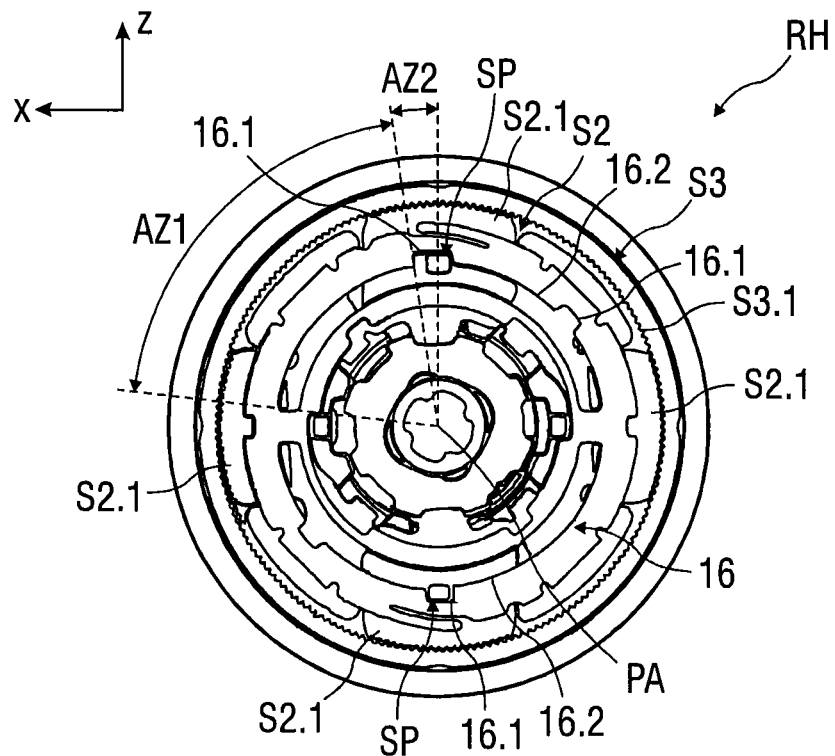
FIG. 12B shows a side view of an embodiment of a pivot fitting comprising a recliner heart.

In particular, the pivot fitting PF comprises a recliner mechanism as schematically shown in FIGS. 12A and 12B. The recliner mechanism comprises a recliner heart RH, wherein a free swing gate 16 is provided within the recliner heart RH. The free swing gate 16 is configured to allow the unimpeded motion of the second fitting member PF2. In an embodiment, the free swing gate 16 is a disc or plate. The pivot axis PA is provided by a pivot pin 8. Furthermore, the pivot fitting PF comprises a calibration stop pin 9 which is configured to interact with the adjustment member 6. Therefore, the adjustment member 6 comprises at least one guide element 6.3 in which the calibration stop pin 9 is guided. The guide element 6.3 is formed as an opening on an inner portion of the adjustment member 6. For example, the pivot fitting PF is coupled to a not further shown electronic control unit. Depending on a contact surface 6.4, 6.5 of the adjustment member 6 the electronic control unit is configured to operate, actuate or deactivate the drive unit 7. When one of the contact surfaces 6.4, 6.5 comes into contact with the calibration stop pin 9 a corresponding travel end position (P6) of the adjustment member 6 is identified. In the initial position P3 of the adjustment member 6 the contact surface 6.5 is in engagement with the calibration stop pin 9. That means when the contact surface 6.5 comes into contact with the calibration stop pin 9, the electronic control unit detects that the adjustment member 6 has reached the initial position P3 and the drive unit 7 can be deactivated.

Figure 4:
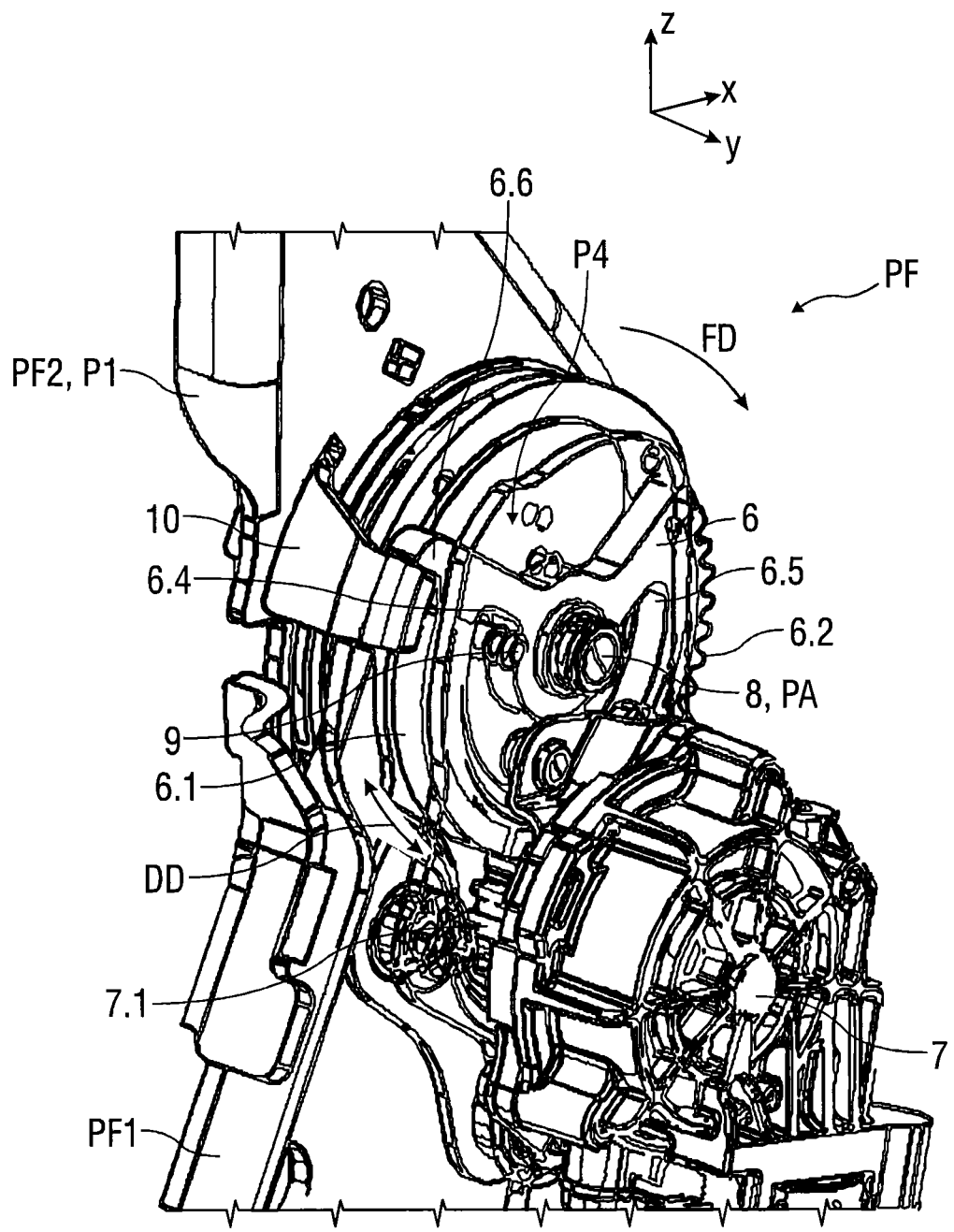
FIG. 4 shows a perspective view of the pivot fitting according to FIG. 3, wherein the adjustment member is shown in a second position.

Upon releasing the second fitting member PF2 to be pivoted from the upright use position P1 to the non-use position P2 the adjustment member 6 is configured to remain in the initial position P3, wherein when actuating the drive unit 7 the adjustment member 6 is configured to be driven from the initial position P3 to a second position P4, as shown in FIG. 4, to actively adjust the second fitting member PF2 from the non-use position P2 to the upright use position P1. In one embodiment, when the contact surface 6.4 comes into contact with the calibration stop pin 9, the electronic control unit detects that the adjustment member 6 has reached the second position P4 and the second fitting member PF2 has reached the upright use position P1, in particular a first lock position P1.1. The second fitting member PF2 is then locked to the first fitting member PF1 and subsequent, the adjustment member 6 is driven back into the initial position P3 to allow a next actuation cycle of the pivot fitting PF. According to another embodiment, the calibration stop pin 9 is used in down direction only. When lifting the back-rest 3, the fitting members PF1, PF2 lock in the first lock position P1.1. The electronic control unit receives a signal from a switch element 14, in particular shown in FIGS. 8B and 8C, that the fitting members PF1, PF2 are locked, wherein the adjustment member 6 is reversed against the calibration stop pin 9.

In particular, a drive direction DD of the adjustment member 6 from the initial position P3 to the second position P4, such as a travel end position, is a direction opposite the folding direction FD. A drive direction DD of the adjustment member 6 from the second position P4 back to the initial position P3 corresponds to the folding direction FD.

The second fitting member PF2 comprises a lift bracket 10 to be contacted by the adjustment member 6 when adjusting the second fitting member PF2 from the non-use position P2 to the upright use position P1. The lift bracket protrudes from the second fitting member PF2 over the adjustment member 6. The lift bracket 10 is arranged on a rear side of the second fitting member PF2 such that the lift bracket 10 moves along the free swing segment 6.1 when the second fitting member PF2 is moved in folding direction FD. Further, the adjustment member 6 comprises a stop element 6.6 which, when the drive unit 7 is actuated, comes in contact with the lift bracket 10 to push the second fitting member PF2 from the non-use position P2 to the upright use position P1 contrary to the folding direction FD. The stop element 6.6 is arranged on a front side of the adjustment member 6 when positioned in the initial position P3. When the adjustment member 6 is rotated substantially in a downward direction the stop element 6.6 is rotated towards the lift bracket 10 to push it contrary to the folding direction FD to bring back the second fitting member PF2, so as the back-rest 3, into the upright use position P1.

FIG. 4 shows a perspective view of the pivot fitting PF according to FIG. 3, wherein the adjustment member 6 is shown in a second position P4 and wherein the second pivot fitting PF2 is brought back from the non-use position P2 to the upright use position P1.

Figure 5:
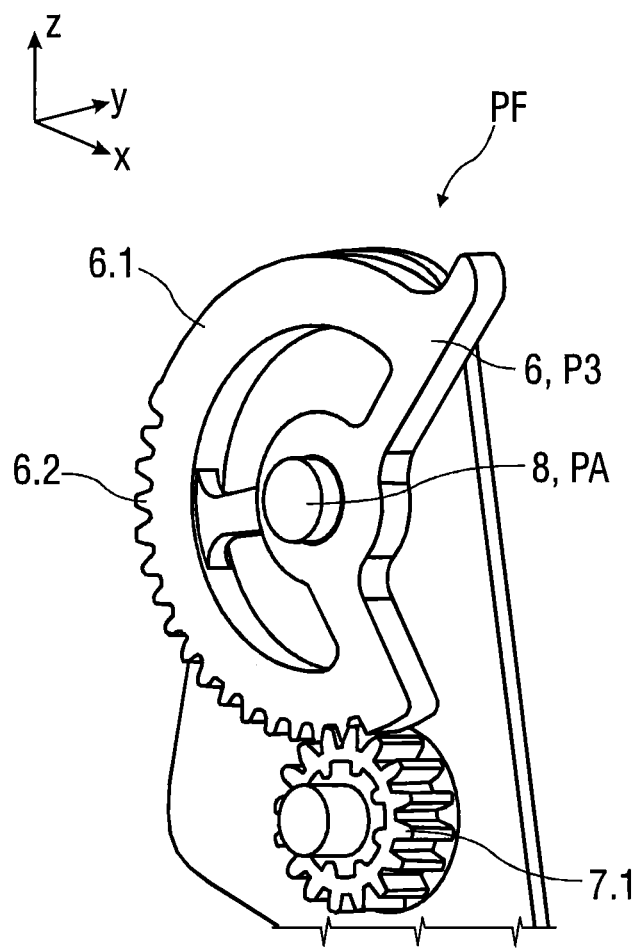
FIG. 5 shows a perspective view of pivot fitting components.

FIG. 5 shows a perspective view of pivot fitting components; in particular the adjustment member 6 and the pinion 7.1 in the initial position P3 of the adjustment member 6, wherein an engagement of the toothed segment 6.2 and the pinion 7.1 is shown.

Figure 6:
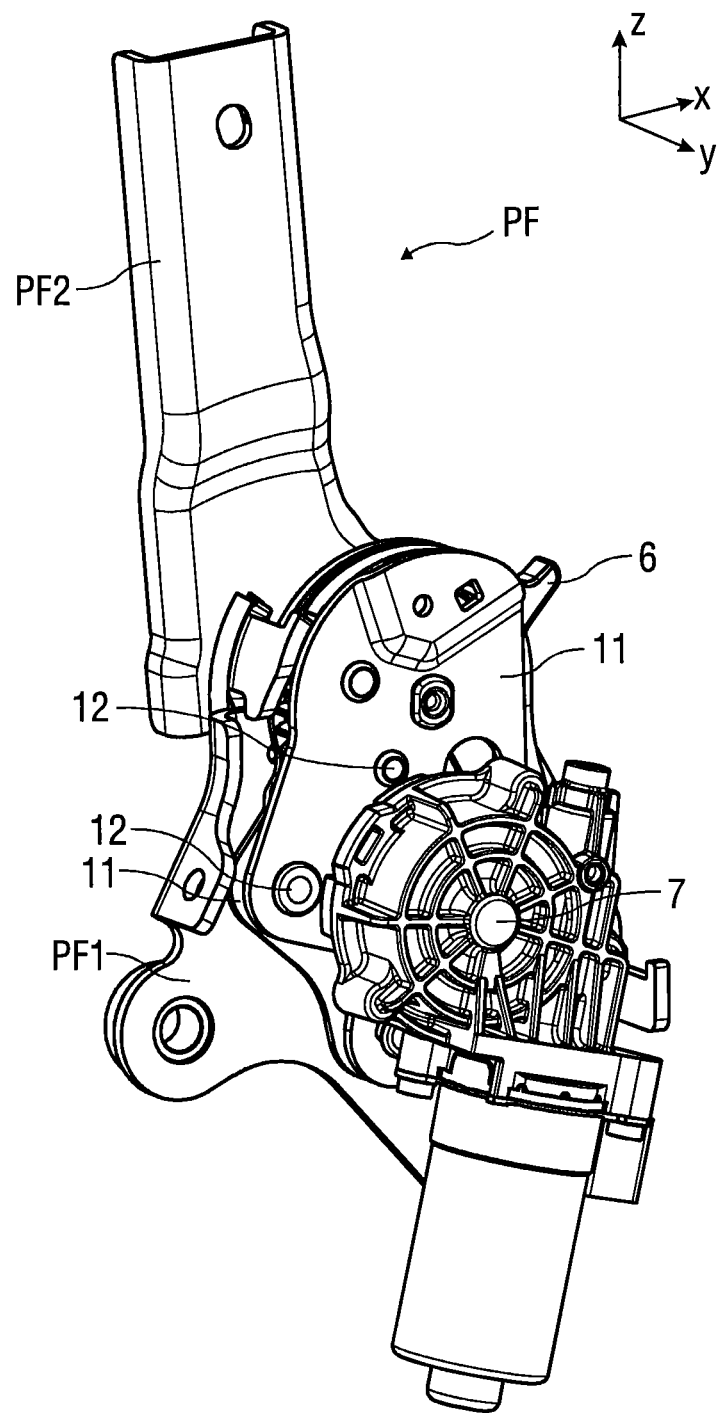
FIG. 6 shows a perspective view of an embodiment of a pivot fitting.

FIG. 6 shows a perspective view of an embodiment of a pivot fitting PF comprising additional mounting plates 11 for mounting at least the adjustment member 6, the drive unit 7 and the pinion 7.1 to the first and second fitting members PF1, PF2. The mounting plates 11 are fixed to the first fitting member PF1 by means of fixation elements 12, such as bolts and/or screws.

Figure 7A:
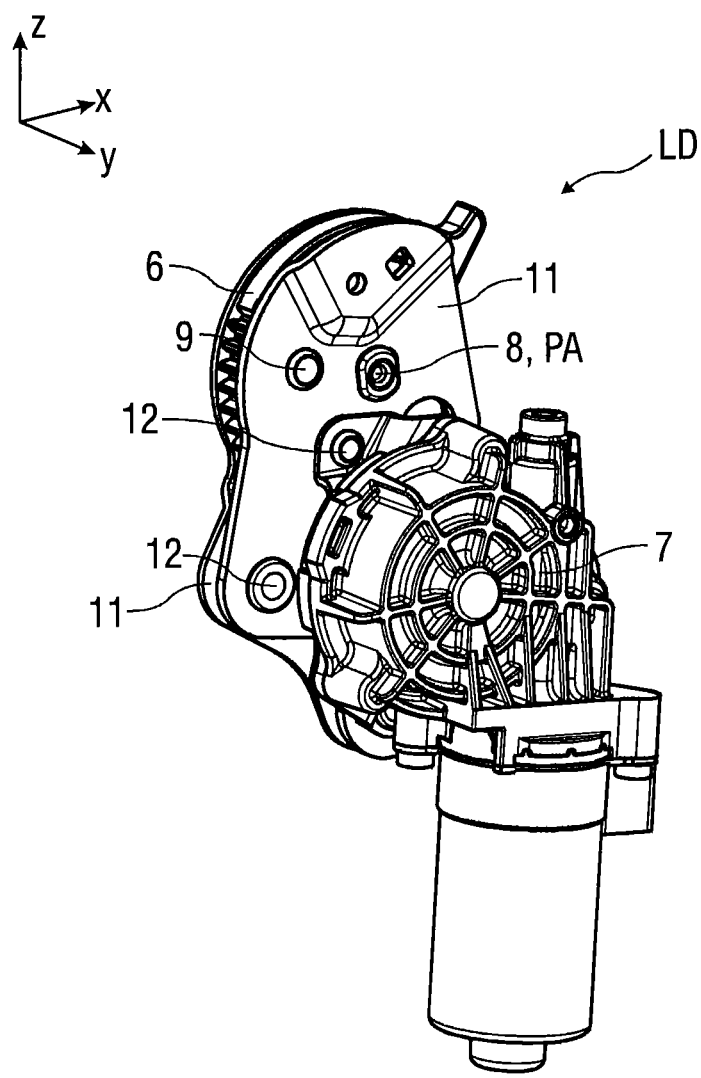
FIG. 7A shows a perspective view of an embodiment of a lift device of a pivot fitting.
Figure 7B:
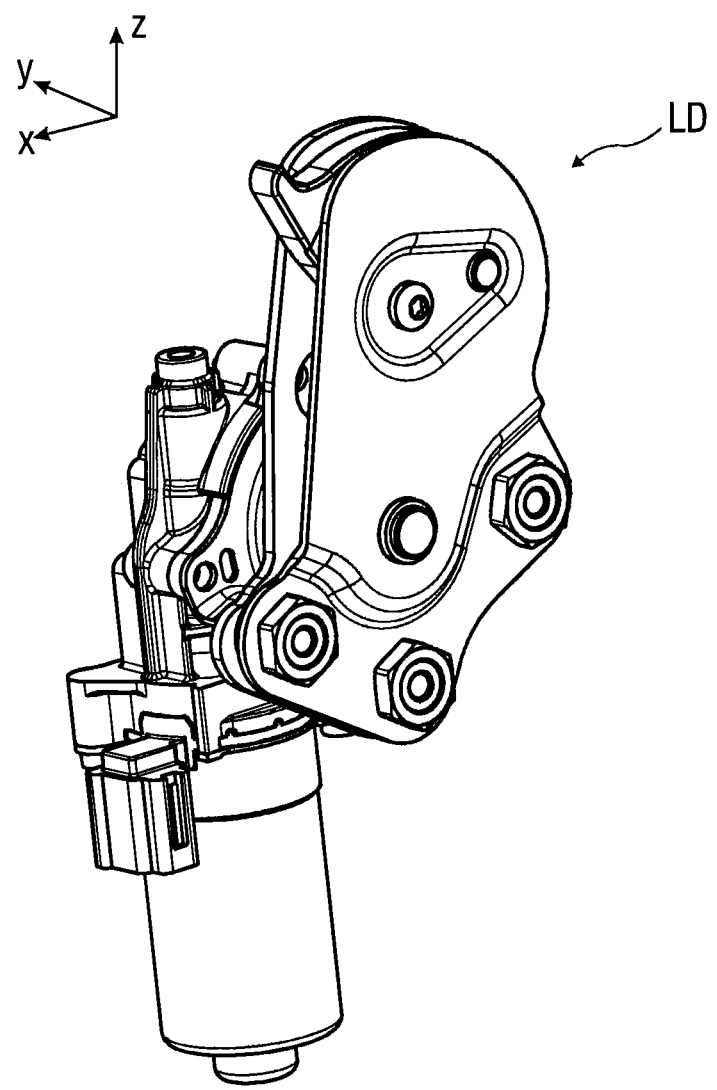
FIG. 7B shows a perspective view of an embodiment of a lift device of a pivot fitting.

FIGS. 7A and 7B show perspective views of an embodiment of an lift device LD of the pivot fitting PF. In particular, the lift device LD is a power up module and which is configured as a modular add on system. The lift device LD can be installed at structure level to a seat structure. The lift device LD comprises at least the drive unit 7, the pinion 7.1 and the adjustment member 6. Thereby, the lift device LD is configured to lift the back-rest 3 from the non-use position P2 to the upright use position P1.

Figure 8A:
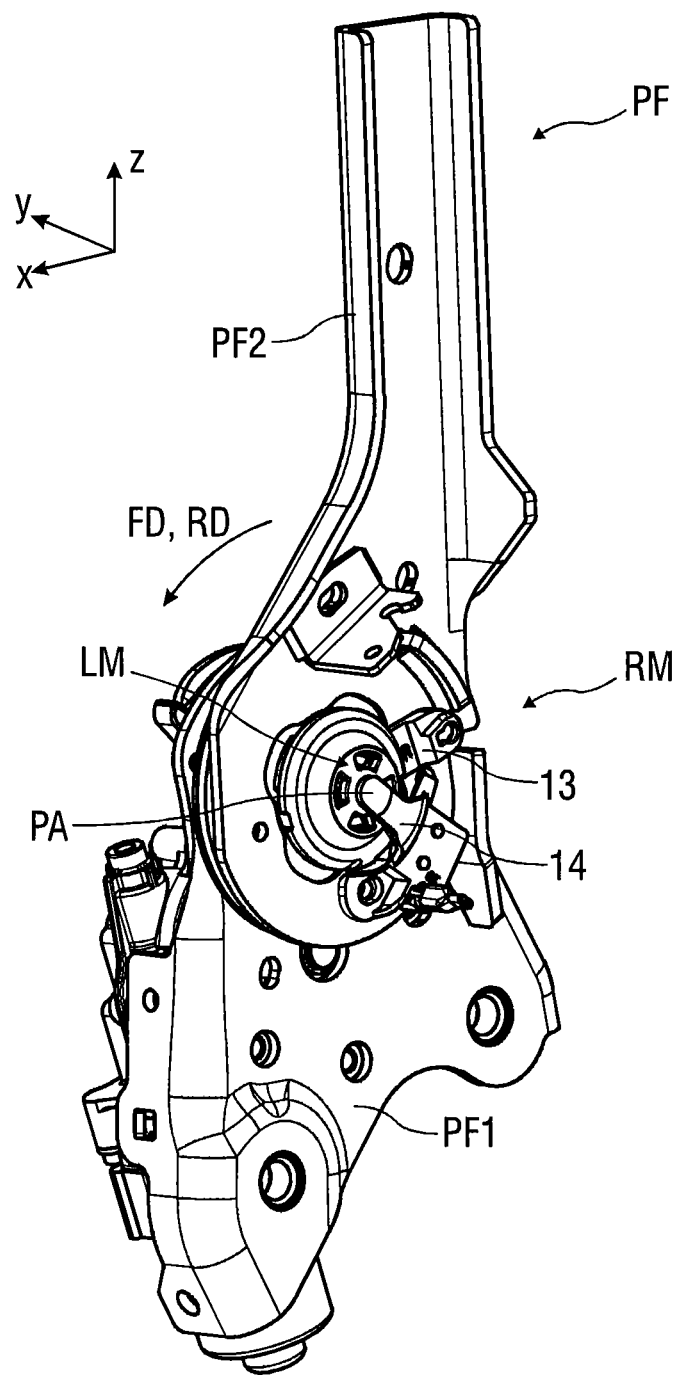
FIG. 8A shows a perspective view of an embodiment of a release mechanism of a pivot fitting.
Figure 8B:
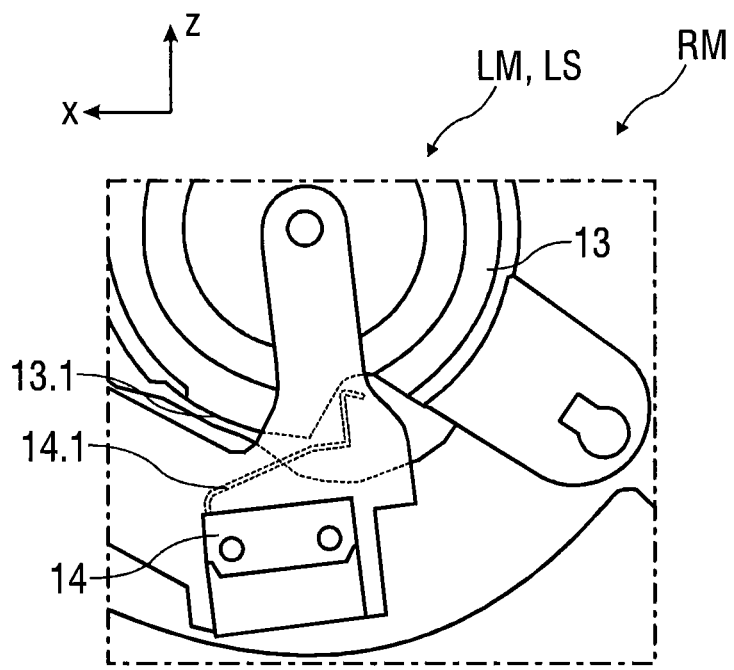
FIG. 8B shows a perspective view and side view of an embodiment of a release mechanism of a pivot fitting.
Figure 8C:
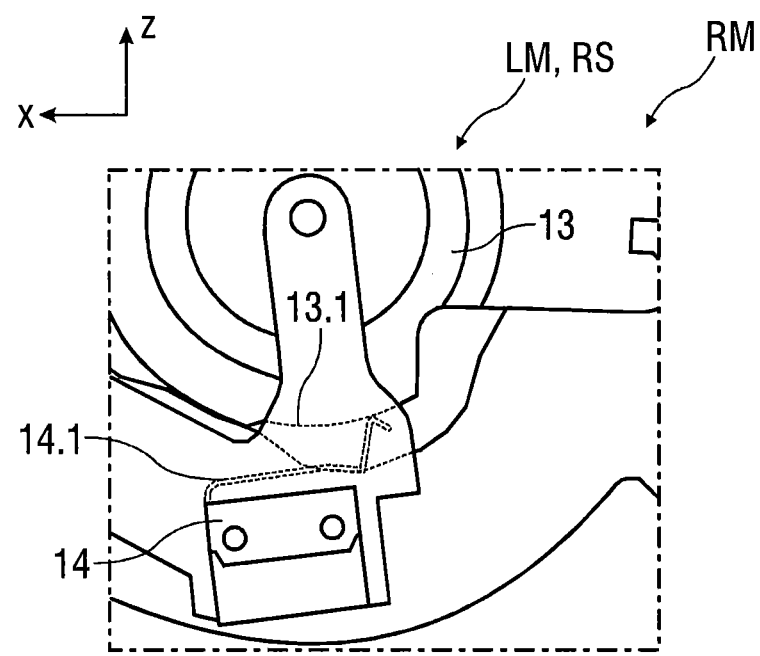
FIG. 8C shows a side view of an embodiment of a release mechanism of a pivot fitting.

FIGS. 8A to 8C show a perspective view and side views of an embodiment of a release mechanism RM and a lock mechanism LM of a pivot fitting PF. For example, the lock mechanism LM is configured to lock the second fitting member PF2 and the first fitting member PF1 in the upright use position P1. The lock mechanism LM disables a pivoting of the second fitting member PF2 relative to the first fitting member PF1. For instance, when the lock mechanism LM is in a locked state LS, shown in FIG. 8B, the second fitting member PF2 and the first fitting member PF1 are fixedly engaged with each other. When the lock mechanism LM is in a released state RS, shown in FIG. 8C, the second fitting member PF2 is disengaged from the first fitting member PF1. Moreover, the release mechanism RM comprises at least a release lever 13 which releases, particularly unlocks, the lock mechanism LM. In particular, the release lever 13 is configured to release and unlock the second fitting member PF2 from the first fitting member PF1. Therefore, the release mechanism RM comprises a switch element 14, such as an electric switch, in particular a micro switch. The switch element 14 is coupled to the lock mechanism LM. The switch element 14 is arranged in a range of the release lever 13 such that when the release lever 13 is actuated, the release lever 13 comes in contact with the switch element 14. When the release lever 13 is actuated, the release lever 13 actuates the switch element 14 when the lock mechanism LM is released. The release lever 13 is pivotable coupled to the first and second fitting members PF1, PF2. The release lever 13 comprises an actuating contacting area 13.1 which is configured to actuate the switch element 14. Upon releasing the release lever 13, the release lever rotates about the pivot axis PA in a release direction RD, which for instance corresponds to the folding direction, wherein the contacting area 13.1 actuates the switch element 14, in particular by contacting a tipping-point 14.1 of the switch element 14. When the second fitting member PF2 is moved back into the upright use position P1, the release lever 13 rotates in an opposite direction of the release direction RD, wherein the tipping-point 14.1 is set free from the contacting area 13.1. For instance, the release lever 13 is coupled to a release handle and/or drive unit 7 via the operation device 5.

FIGS. 9A and 9B show perspective views of an embodiment of a pivot fitting PF and a lift device LD, wherein the second fitting member PF2 and the lift device LD are in the non-use position P2. For example, as shown in FIG. 9A, a gap is provided between the lift bracket 10 and the stop element 6.6 to power the lift bracket 10. Further, as shown in FIG. 9B, the second fitting member PF2 comprises a hard stop element 15 which is arranged on a lower portion of the second fitting member PF2, wherein the first fitting member PF1 comprises a corresponding hard stop element 15' on a rear side of the first fitting member PF1. In the non-use position P2 of the second fitting member PF2 both hard stop elements 15, 15' engages each other.

Figure 10:
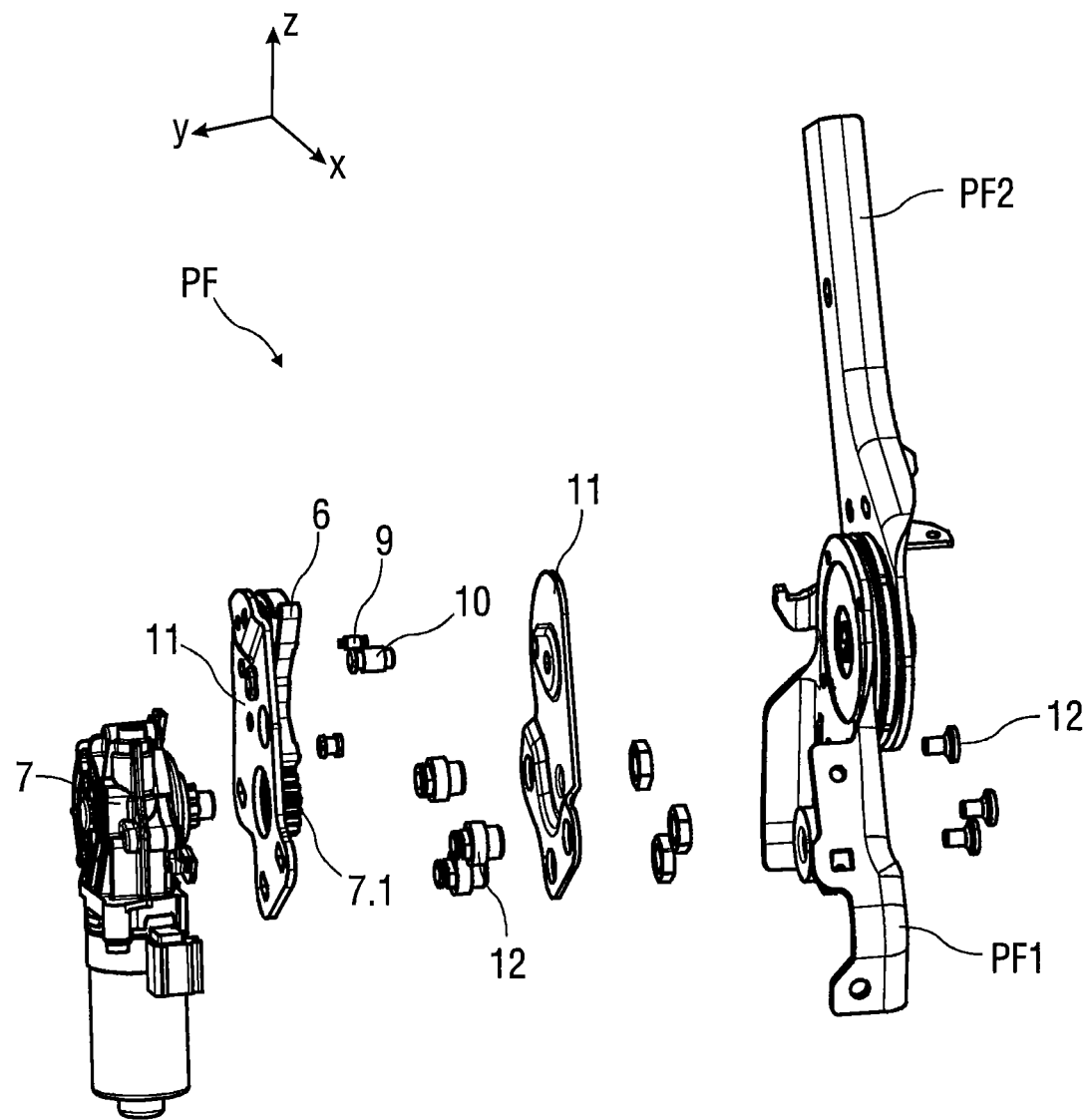
FIG. 10 shows an exploded view of an embodiment of a pivot fitting.

FIG. 10 shows an exploded view of an embodiment of a pivot fitting PF.

Figure 11:
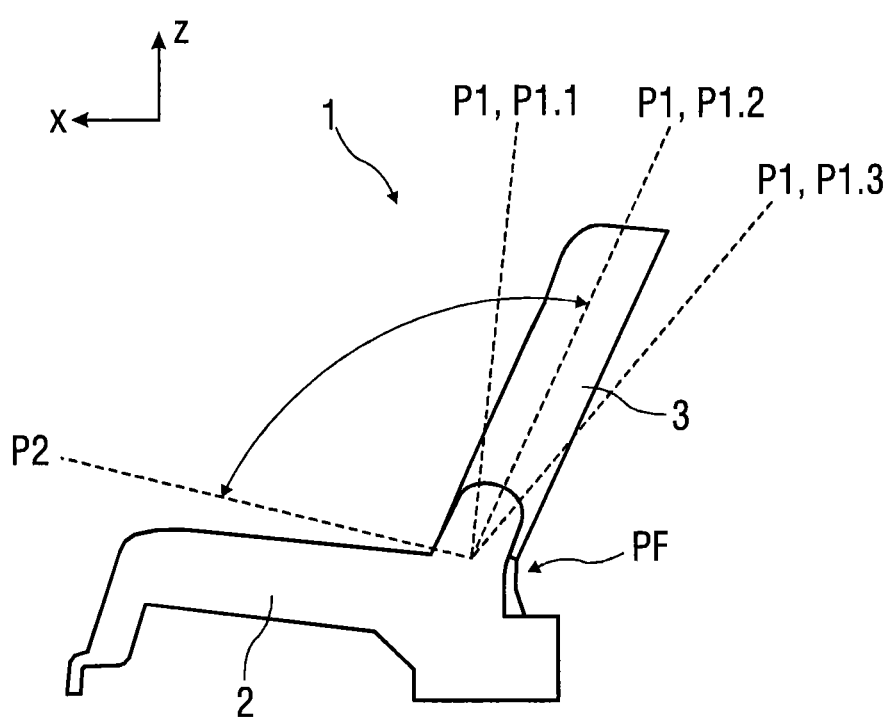
FIG. 11 shows a side view of an embodiment of the seat, wherein a back-rest of the seat is pivotable between different positions.

FIG. 11 shows a side view of an embodiment of the seat 1, wherein a back-rest 3 of the seat 1 is pivotable between different positions. The positions comprise at least three upright use positions P1 and a non-use position P2. The upright use positions P1 are one of a first lock position P1.1, an upright design position P1.2 and a comfort use position P1.3. For example, when the pivot fitting PF is locked in the first lock position P1.1, the back-rest 3 can be enabled to pivot into a further upright inclined position, such as the upright design position P1.2 and the comfort use position P1.3. For instance, the pivot fitting PF is coupled to a not further shown additional handle actuation mechanism. When the back-rest 3 is locked in the first lock position P1.1, the back-rest 3 can be enabled by the additional handle actuation mechanism to be further pivoted and locked in one of the upright design position P1.2 and/or comfort use position P1.3 or any other position there between.

FIG. 12A shows an exploded view of the pivot fitting PF comprising a recliner heart RH. The recliner heart RH is substantially arranged between the first fitting member PF1 and the second fitting member PF2. Exemplary, the recliner heart RH comprises a fixed segment S1 such as a guide which is fixed to the first fitting member PF1, a clock spring 26, a driver element 27, a cam element 28, segments S2, a control disk 29, a free swing gate 16, a rotatable segment S3 such as a gear rim and a clamping ring 30, wherein the rotatable segment S3 is arranged on the clamping ring 30 and fixed to the second fitting member PF2. For instance, the rotatable segment S3 is rotatable relative to the fixed segment S1 about the back-rest pivot axis PA.

Figure 12C:
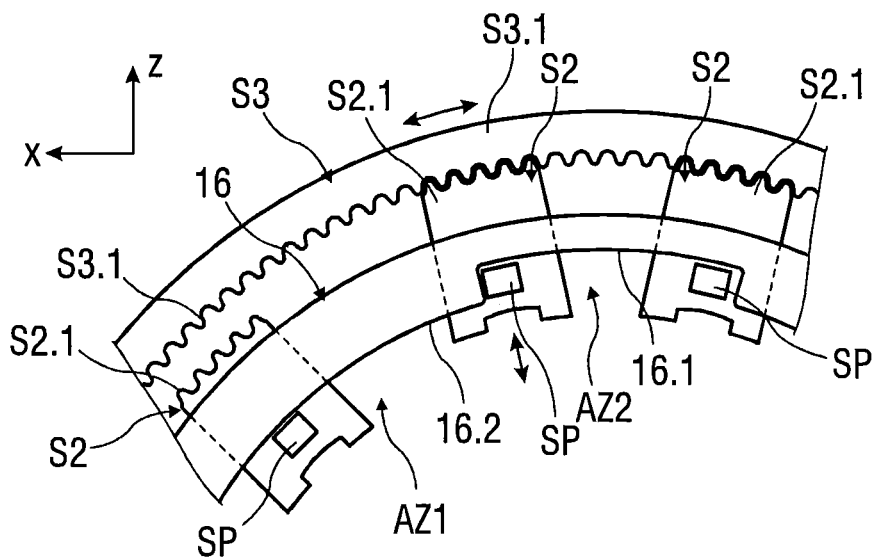
FIG. 12C shows an enlarged view of a section of the recliner heart.

FIG. 12B shows a side view of an embodiment of a pivot fitting PF comprising a recliner heart RH. The recliner heart RH provides a number of zones AZ1, AZ2 for movement of the back-rest 3. In particular, the pivot fitting PF is configured as a rotary recliner comprising a recliner heart RH. The recliner heart RH provides a free swing zone AZ1 and a comfort adjustment zone AZ2. Moreover, the recliner heart RH comprises a fixed segment S1 and a rotatable segment S3. The rotatable segment S3 comprises a toothed portion S3.1 which can be released from the fixed segment S1 to release the second fitting member PF2 and locked to the fixed segment S1 to lock the second fitting member PF2. The rotatable segment S3 is coupled to the second fitting member PF2. Further, the recliner heart RH comprises segments S2 which slide in channels of the fixed segment S1 to release the rotatable segment S3 and allow the segment S3 to rotate. The segments S2 comprise toothed portions S2.1 which can engage and disengage the toothed portion S3.1 of the rotatable segment S3. Furthermore, segments S2 comprise segment portions SP such as projections, studs or the like. Each segment portion SP protrudes from a surface of the corresponding segment S2. Each segment portion SP protrudes from a surface of the corresponding segment S2 in a direction towards the rotatable segment S3, in particular towards the free swing gate 16. The segment portions SP are configured as semi-pierce features. The rotatable segment S3 comprises a free swing gate 16, wherein the segment portions SP are configured to ride on a free swing gate surface. In a locked condition of the recliner heart RH, the segment portions SP, in particular the projections, engage a respective notch 16.1 as shown in FIG. 12C. The notch 16.1 is formed on an inner guiding recess 16.2 of the free swing gate 16. The segment portions SP, in particular the projections, are guided in the guiding recess 16.2 and are enabled riding along a surface of the guiding recess 16.2 in an unlocked condition of the recliner heart RH. This guiding surface defines the free swing zone AZ1. In particular, the free swing zone AZ1 is a dwell zone. The guiding recess 16.2 is shaped over a semicircular portion of the free swing gate 16. In particular, the guiding recess 16.2 provides the free swing zone AZ1 and the comfort adjustment zone AZ2. The guiding recess 16.2 is formed within the free swing gate 16. For example, the guiding recess 16.2 is shaped over a quadrant portion of the free swing gate 16. The guiding recess 16.2 is configured as dwell zone. The dwell zone, in particular the free swing zone AZ1 is configured to allow that the movable second fitting member PF2 is enabled to be moved about up to 110°, for example 105° between the non-use position P2 and at least one of the upright use positions P1, P1.1 to P1.3.

In the free swing zone AZ1 the recliner heart RH remains unlocked. In particular, the segment portions SP ride freely on the free swing gate 16 in the free swing zone AZ1 to keep the rotatable segment S3 released from the fixed segment S1. That means to keep the segments S2 from locking. In the free swing zone AZ1 the toothed portions S2.1 are kept disengaged from the toothed portions S3.1 of the rotatable segment S3. In particular, the free swing gate 16 is configured to allow an unimpeded motion of the rotatable segment S3 relative to the fixed segment S1. When the rotatable segment S3 is disengaged from the fixed segment S1, the back-rest 3 may be stowed in an unimpeded motion. Once the back-rest 3 is stowed, the rotatable segment S3 is positioned in a return actuation position so that when the drive unit 7 is powered, the segment S3 and the back-rest 3 are driven to the first locked position P1.1 of the back-rest 3. In the first locked position P1.1, the segments S1 and S3 are locked. For example, in the first lock position P1.1 the segment portions SP projections engage their respective notch 16.1 again and allow the teeth of the toothed portions S2.1 to engage as shown in FIG. 12C. For further adjustment of the back-rest 3 at least to the comfort use position P1.3, the recliner heart RH may be actuated again such that the toothed portions S2.1 disengage their respective teeth and the projections move in the notch 16.1 until the back-rest 3 reaches the comfort use position P1.3. In the comfort use position P1.3 the toothed portions S2.1 engage the other respective toothed portions S3.1.

FIG. 12C shows an enlarged view of a section of the recliner heart RH. The segment portion SP projections are either guided on the surface of the guiding recess 16.2 or located in the notch 16.1. The toothed portions S2.1 are allowed to engage the respective toothed portions S3.1 of the rotatable segment S3 when the projections are located in the notch 16.1. The toothed portions S2.1 are disengaged from the respective toothed portions S3.1 when the projections are guided on the surface of the guiding recess 16.2. The user may hold the segments S2 unlocked via turning the driver element 27 when the projections are in the zone of the notch 16.1. This is the comfort adjustment zone AZ2 and by releasing the segments S2 the recliner heart RH relocks. In the zone of the guiding recess 16.2, the recliner heart RH is held unlocked by itself. The projections do not allow the teeth of the toothed portions S2.1 to engage.

Figure 13:
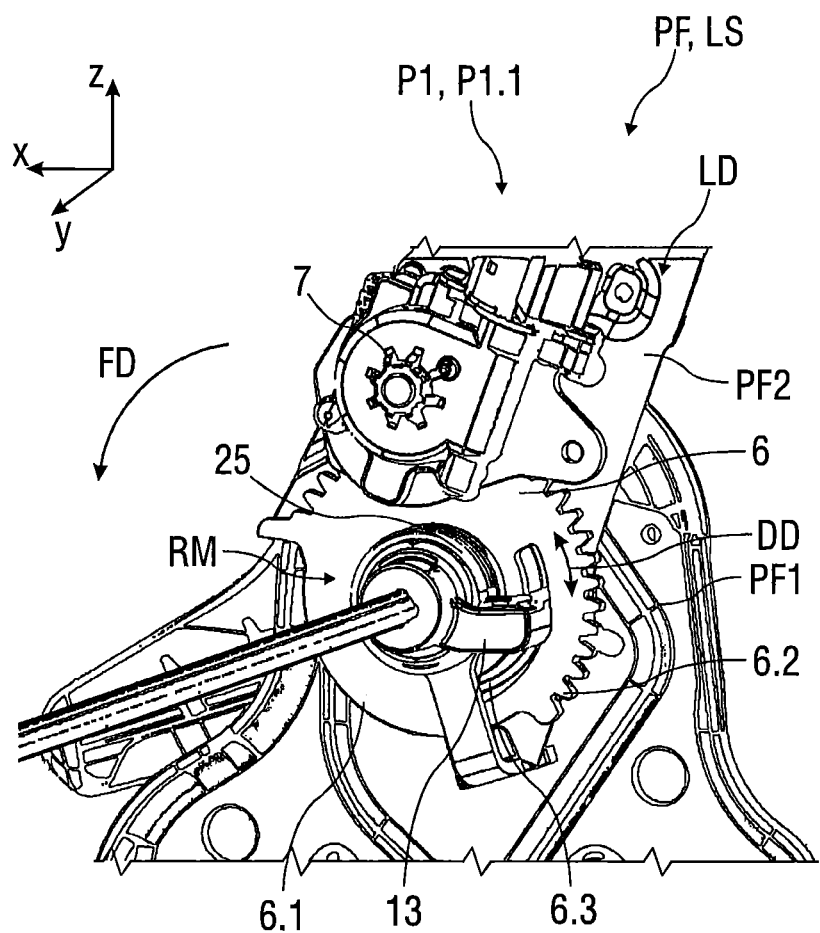
FIG. 13 shows a perspective view of another embodiment of a pivot fitting for adjustment of a pivoting of a back-rest relative to a seat pan of a seat.

FIG. 13 shows a perspective view of another embodiment of a pivot fitting PF for adjustment of a pivoting of a back-rest 3 relative to a seat pan 2 of a seat 1. The pivot fitting PF comprises a first fitting member PF1 which is fixed to the seat pan 2, a second fitting member PF2 which is pivotable coupled to the first fitting member PF1 and which is fixed to the back-rest 3. Further, the pivot fitting PF comprises an adjustment member 6 comprising a free swing segment 6.1 and a toothed segment 6.2 and which is rotatable coupled to the first and second fitting members PF1, PF2. The pivot fitting PF comprises a drive unit 7 which is fixedly mounted to the second fitting member PF2 and configured to adjust the second fitting member PF2 about a pivot axis PA, wherein the free swing segment 6.1 is configured to allow an unimpeded motion of the second fitting member PF2 and the drive unit 7 relative to the first fitting member PF1 from an upright use position P1 to a non-use position P2 as shown in FIG. 15C, wherein, when actuating the drive unit 7, the drive unit 7 is configured to move along the toothed segment 6.2 of the adjustment member 6 to adjust the second fitting member PF2 from the non-use position P2 to the upright use position P1.

Figure 14A:
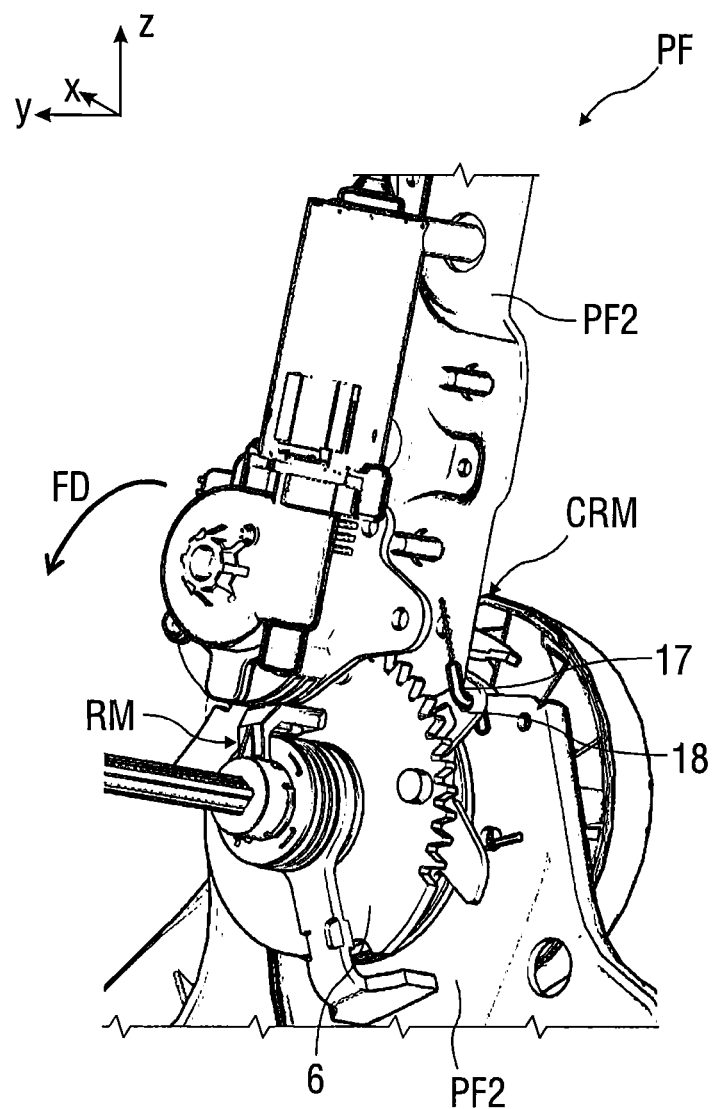
FIG. 14A shows a perspective view of another embodiment of a pivot fitting.
Figure 14B:
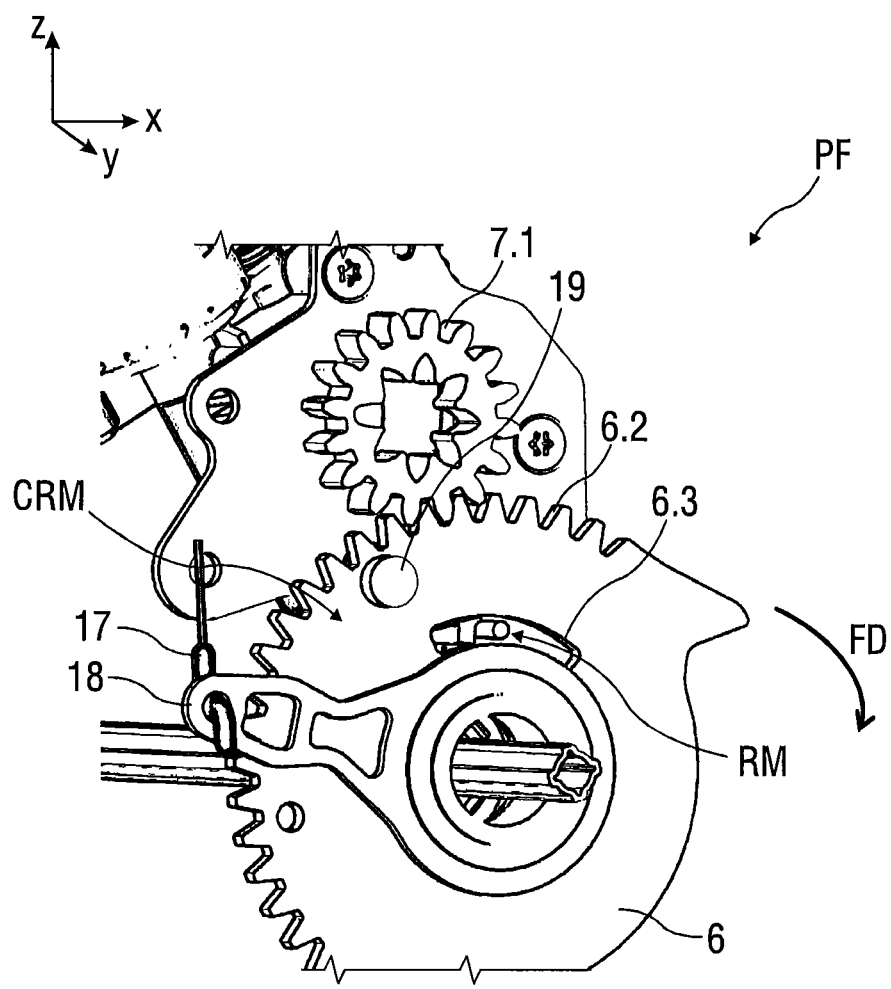
FIG. 14B shows a perspective view of another embodiment of a pivot fitting.

The drive unit 7 comprises a drivable pinion 7.1 and which is coupled to the toothed segment 6.2 of the adjustment member 6 as shown in FIG. 14B. A release mechanism RM comprises at least a release lever 13 which is configured to engage a guide element 6.3 of the adjustment member 6 to lock the second fitting member PF2 or disengage from the guide element 6.3 to release the second fitting member PF2. In the shown embodiment, the adjustment member 6, the drive unit 7 and the pinion 7.1 are configured as a lift device LD. The lift device LD is configured to lift the back-rest 3 from the non-use position P2 to the upright use position P1. Moreover, the lift device LD is also configured to release the back-rest 3 to be pivoted from the upright use position P1 to the non-use position P2, wherein by actuating the lift device LD, the drive unit 7 directly releases the release lever 13 by driving the adjustment member 6.

In particular, upon releasing the second fitting member PF2 to be pivoted from the upright use position P1 to the non-use position P2 the adjustment member 6 is configured to rotate with the second fitting member PF2 such that an orientation of the toothed segment 6.2 of the adjustment member 6 remains relative to the drive unit 7. This motion sequence is shown in FIGS. 15A to 15C.

Furthermore, when the back-rest 3, so as the second fitting member PF2, is positioned in the upright use position P1 and the pivot fitting PF is in a locked state LS, the adjustment member 6 is positioned in an initial position P3 as shown in FIG. 13. When the second fitting member PF2 is moved from the non-use position P2 to the upright use position P1 and locked in the upright use position P1, the drive unit 7 is configured to drive the adjustment member 6 back to the initial position P3. In particular, FIG. 13 shows the second fitting member PF2 in a first lock position P1.1. If a user actuates a operation device 5 the adjustment member 6 is actuated by the drive unit 7 to rotate in a drive direction DD contrary to the folding direction FD to actuate the release mechanism RM, wherein the second fitting member PF2 is disengaged from the first fitting member PF1. Then the adjustment member 6 remains in a free swing position P5 as shown in the FIGS. 15A to 15C, wherein the adjustment member 6 is enabled to rotate with the second fitting member PF2 to the non-use position P2. The free swing segment 6.1 of the adjustment member 6 allows an unimpeded motion of the second fitting member PF2 relative to the first fitting member PF1.

FIGS. 14A and 14B show perspective views of another embodiment of a pivot fitting PF with a feature that releases a headrest 4 as part of the release mechanism RM. This feature reduces the complexity of a stow function in a seat system by eliminating the need for a separate actuator to activate the headrest 4 dump function. The pivot fitting PF, in particular the adjustment member 6, is coupled to a cable release mechanism CRM to release the headrest 4 and enabling a stowing of the headrest 4, particularly enabling a movement of the headrest 4 relative to the back-rest 3 depending on actuation of the pivot fitting PF. The cable release mechanism CRM comprises a flexible cable element 17, such as a Bowden cable, a cable release lever 18 which is connected with the flexible cable element 17 and an actuator pin 19 that drives the cable release lever 18. If a user actuates a operation device 5 the adjustment member 6 is actuated by the drive unit 7 to rotate in a drive direction DD contrary to the folding direction FD to actuate the release mechanism RM, wherein the second fitting member PF2 is disengaged from the first fitting member PF1. During this activation the actuator pin 19 then contacts the cable release lever 18. The actuator pin 19 drives the cable release lever 18, in particular counterclockwise in the shown FIG. 14B, pulling the flexible cable element 17 and releasing the headrest 4. An advantage of this embodiment is that the pivot fitting PF is configured to release the headrest 4 as well as the second fitting member PF2 without requiring separate actuators.

Figure 15A:
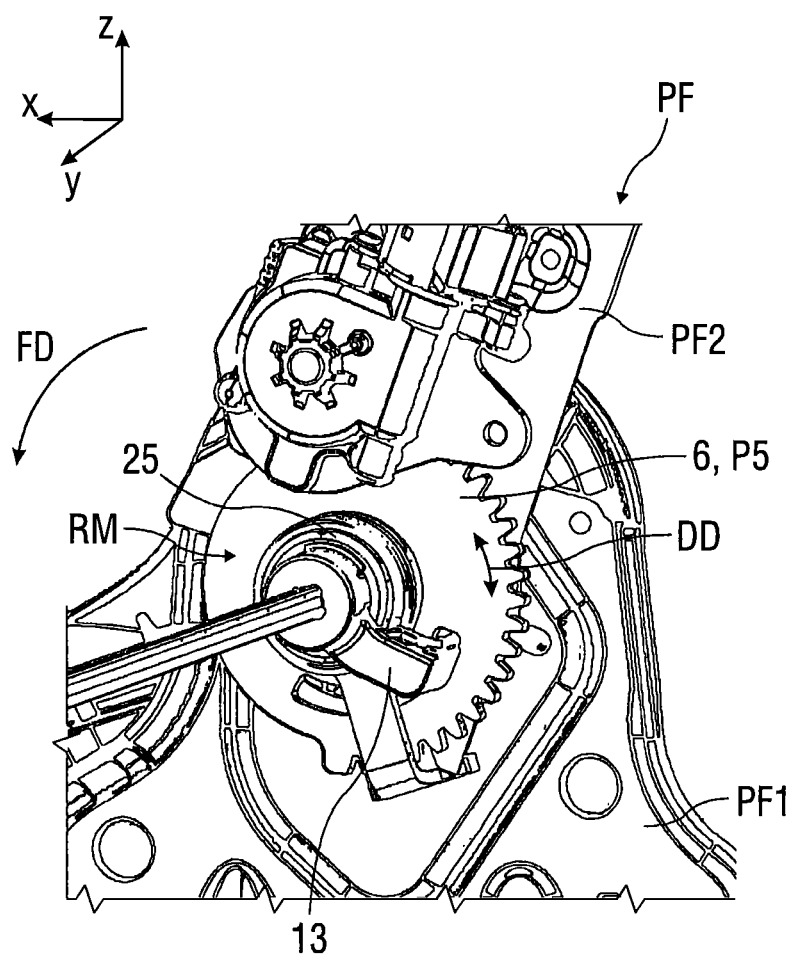
FIG. 15A shows a perspective view of pivot fitting motions.
Figure 15B:
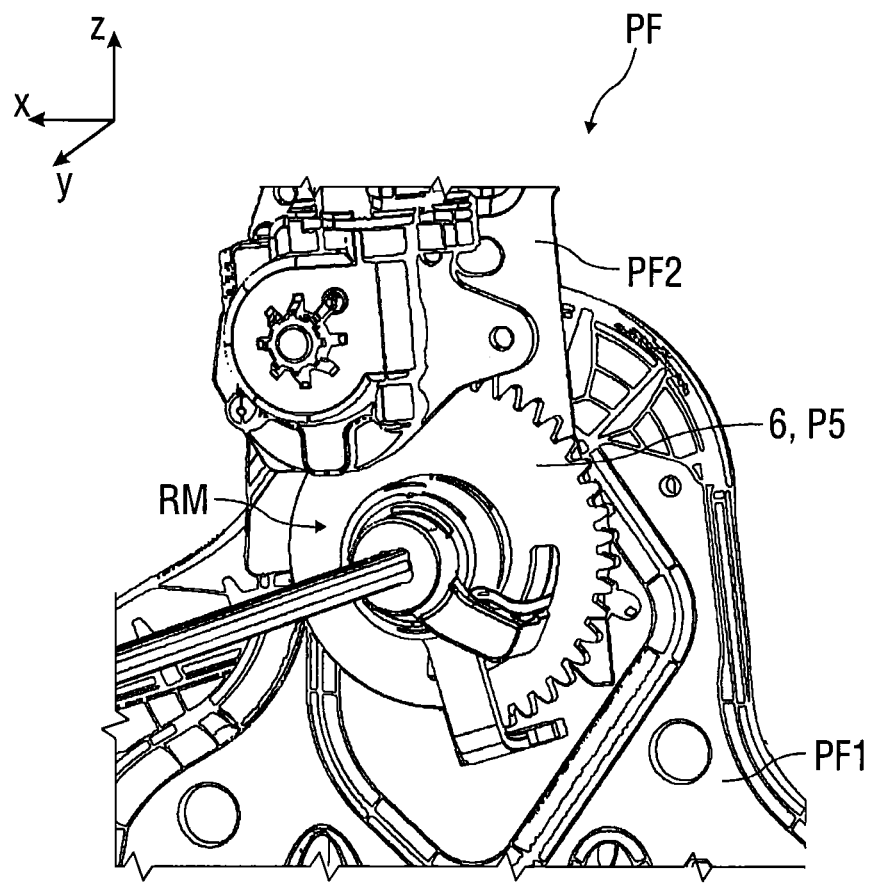
FIG. 15B shows a perspective view of pivot fitting motions.
Figure 15C:
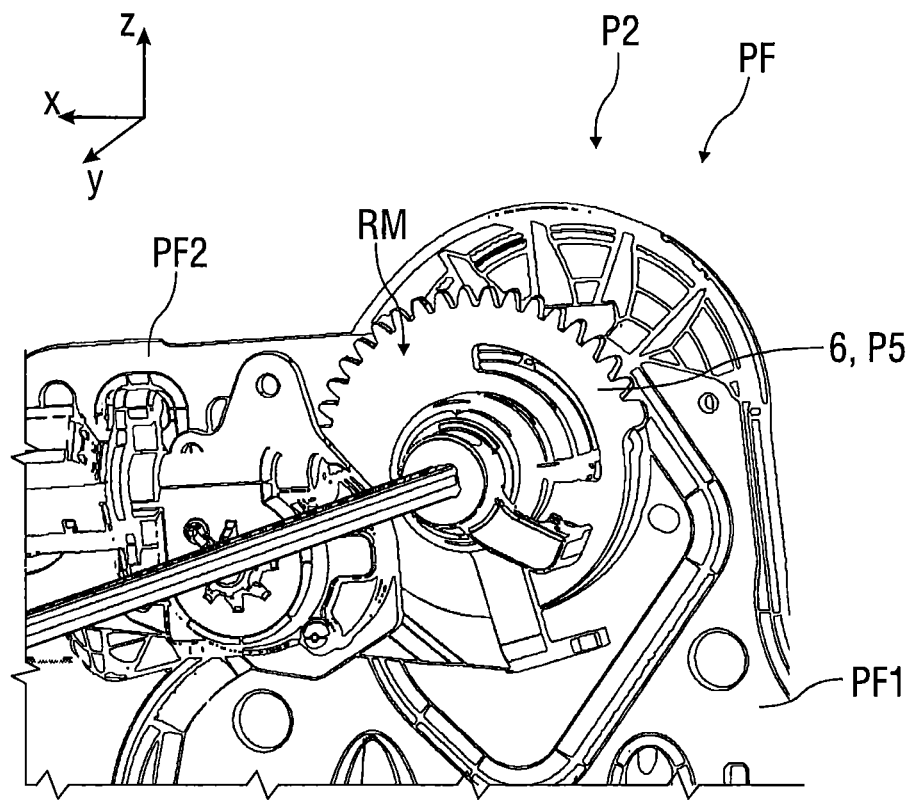
FIG. 15C shows a perspective view of pivot fitting motions.
Figure 15D:
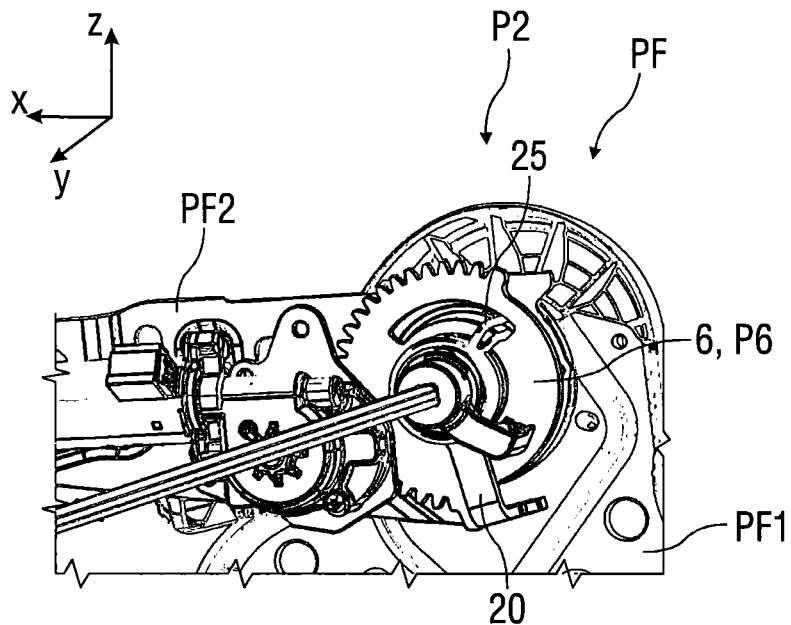
FIG. 15D shows a perspective view of pivot fitting motions.
Figure 15E:
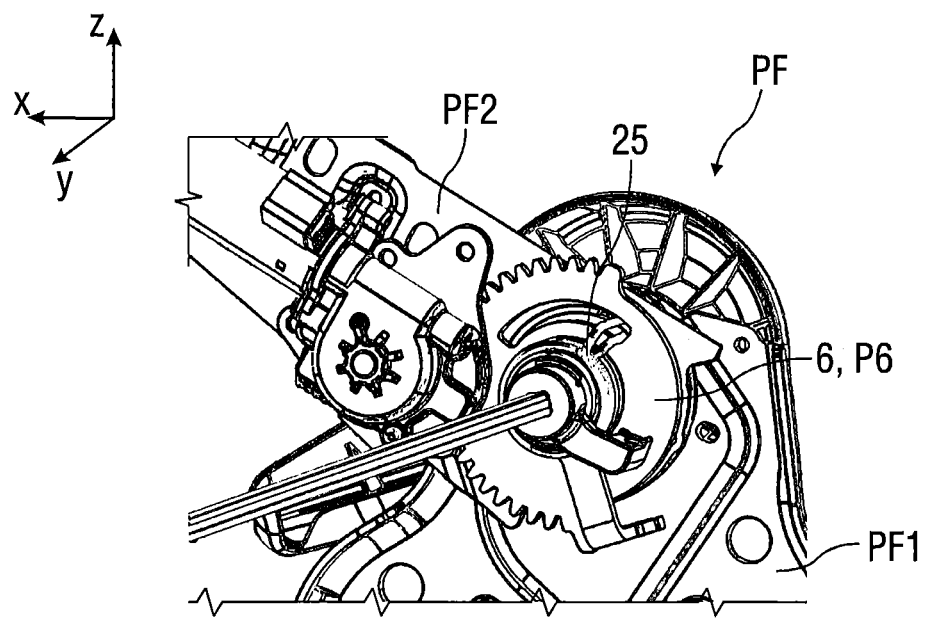
FIG. 15E shows a perspective view of pivot fitting motions.
Figure 15F:
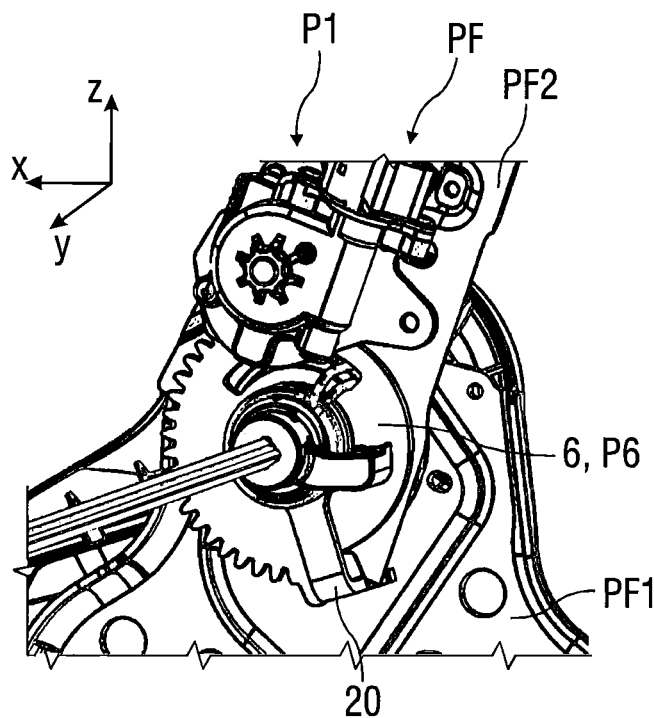
FIG. 15F shows a perspective view of pivot fitting motions.
Figure 15G:
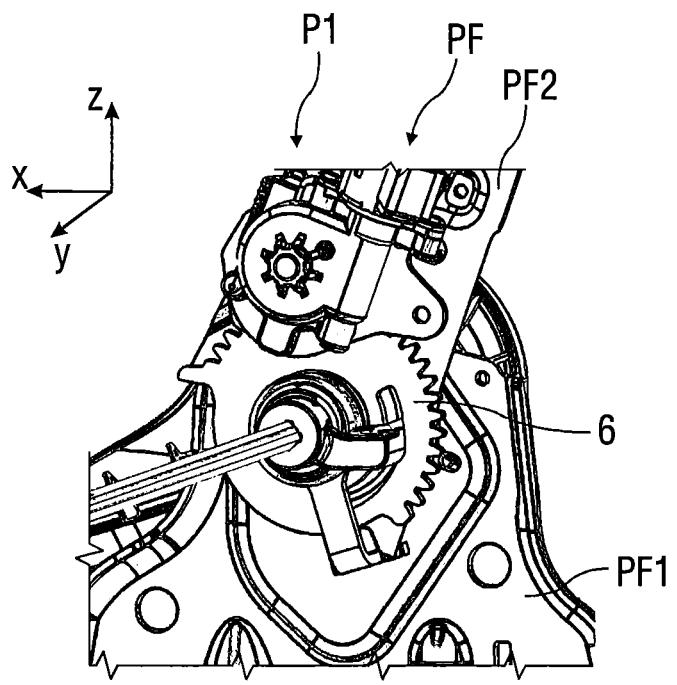
FIG. 15G shows a perspective view of pivot fitting motions.
Figure 16A:
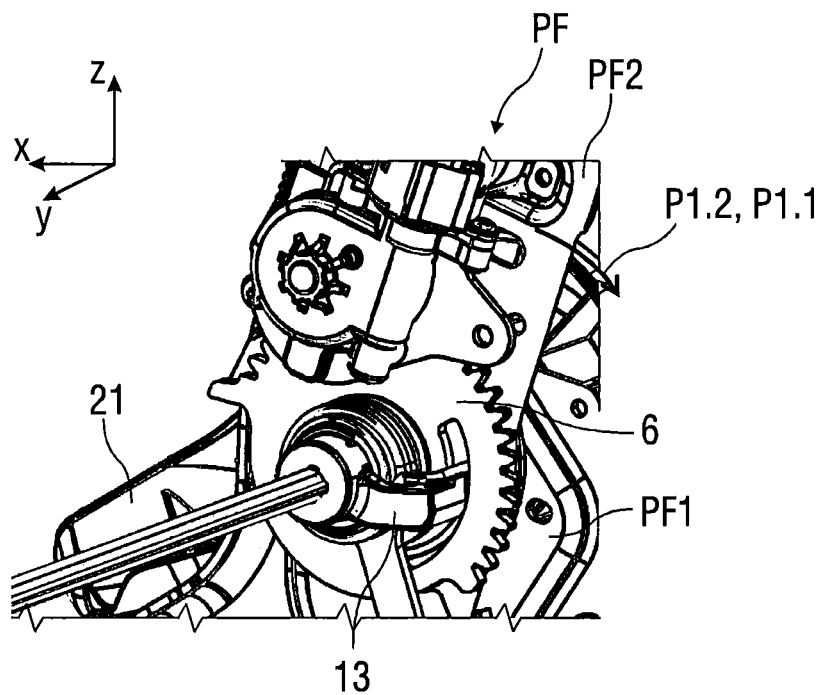
FIG. 16A shows a perspective view of a pivot fitting coupled to a handle actuation mechanism for adjusting a pivoting of a back-rest relative to a seat pan of a seat.
Figure 16B:
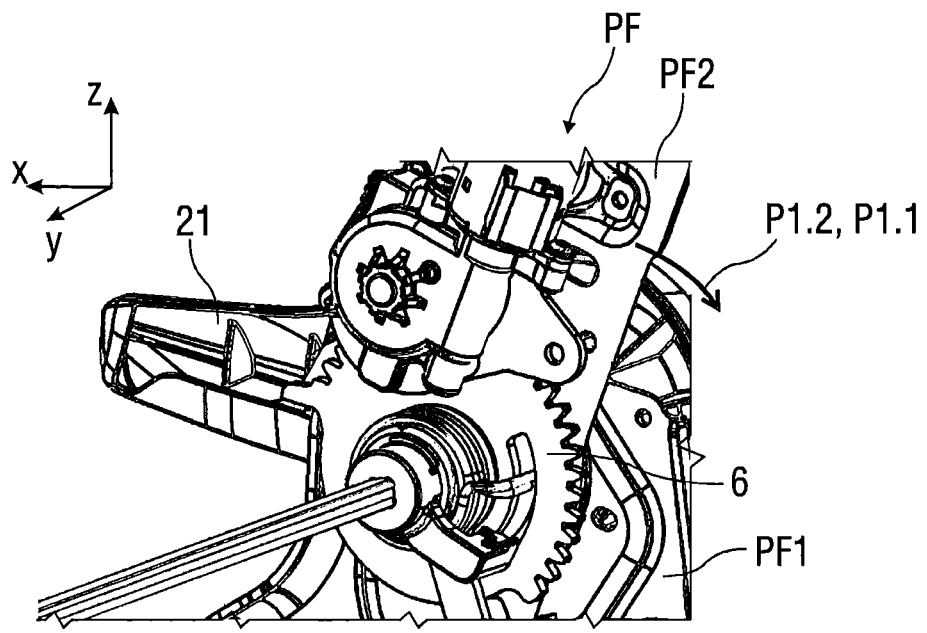
FIG. 16B shows a perspective view of a pivot fitting coupled to a handle actuation mechanism for adjusting a pivoting of a back-rest relative to a seat pan of a seat.
Figure 16C:
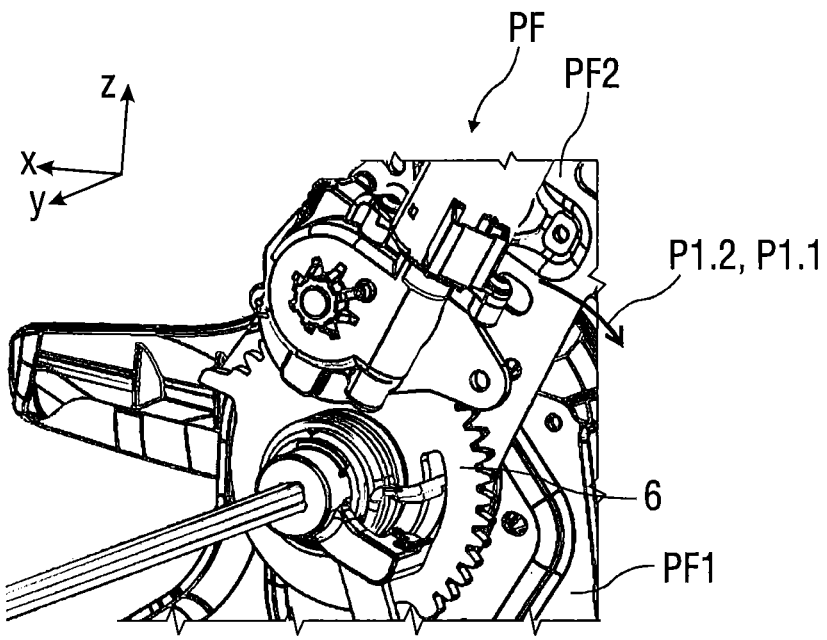
FIG. 16C shows a perspective view of a pivot fitting coupled to a handle actuation mechanism for adjusting a pivoting of a back-rest relative to a seat pan of a seat.
Figure 16D:
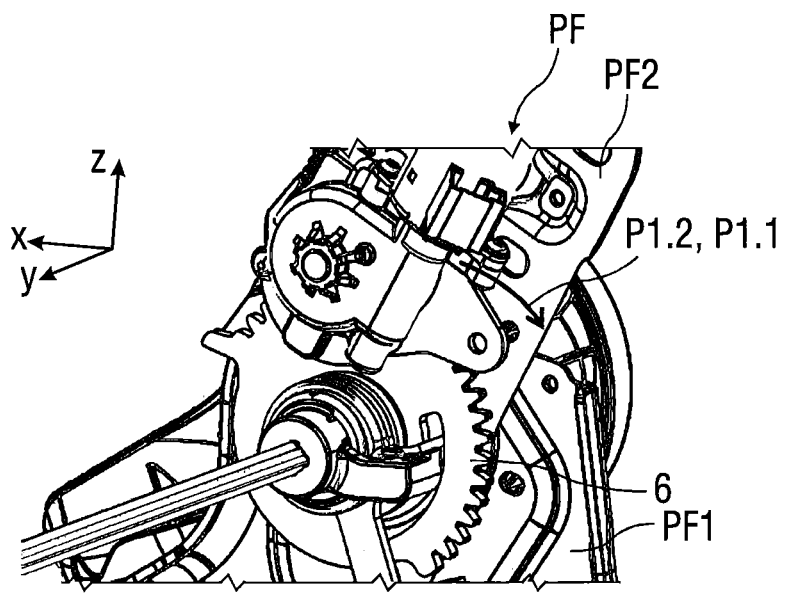
FIG. 16D shows a perspective view of a pivot fitting coupled to a handle actuation mechanism for adjusting a pivoting of a back-rest relative to a seat pan of a seat.

FIGS. 15A to 15G show perspective views of motion sequences of the pivot fitting PF from the upright use position P1 to the non-use position P2 and vice versa, whereby FIG. 13 shows the starting position of the motion sequences. In particular, FIG. 15A shows the release of the second fitting member PF2 by the drive unit 7 driving the adjustment member 6 in a downwards drive direction DD, wherein the adjustment member 6 is about to actuate the release lever 13. FIGS. 15B and 15C show a stowing motion of the second fitting member PF2. Once the back-rest 3 is stowed, the adjustment member 6 is positioned in a return actuation position so that when the drive unit 7 is powered, the back-rest 3 is driven to the upright and first locked position P1.1. FIGS. 15D to 15F show a return motion of the second fitting member PF2 to the first lock position P1.1. FIG. 15G shows a reset motion of the adjustment member 6.

When the second fitting member PF2 reaches the non-use position P2 the adjustment member 6 is further driven into a travel end position P6, wherein the adjustment member 6 is stopped by a stop member 20 as shown in FIG. 15D. The adjustment member 6 remains in the travel end position P6 till the second fitting member PF2 is once moved to the upright use position P1 and locked in this position as shown as a motion sequence in FIGS. 15D to 15F. Afterwards the adjustment member 6 is driven back into the initial position P3 as shown in FIG. 15G.

In the shown embodiment, a torque coil spring 25 is provided in an area of the adjustment member 6. The torque coil spring 25 provides a one way clutch to prevent the second fitting member PF2 from relocking if the release occurs from a full rear adjustment position. In particular, the torque coil spring 25 is configured as a coil spring brake device. For example, the adjustment member 6 would outrun the release lever 13 when the adjustment member 6 begins to move to the non-use position P2. That means that the adjustment member 6 allows the release lever 13 to relock before the segment portion SP projections reach the guiding recess 16.2. The torque coil spring 25 remains behind to keep the second fitting member PF2 open. That means that the torque coil spring 25 holds the release lever 13 released until the recliner is in the free swing zone AZ1. As shown in FIG. 15C the coil spring 25 has been rotated forward or upward from the release lever 13 through the adjustment member 6. The release lever 13 is held open by the recliner internal free swing gate 16.

FIGS. 16A to 16D show perspective views of a pivot fitting PF coupled to a handle actuation mechanism 21 for adjusting a manual pivoting of a back-rest 3 into one of an upright design position P1.2 and a comfort use position P1.3. In particular a motion sequence is shown. For instance, the handle actuation mechanism 21 is coupled to a release lever 13 of the release mechanism RM.

Figure 17:
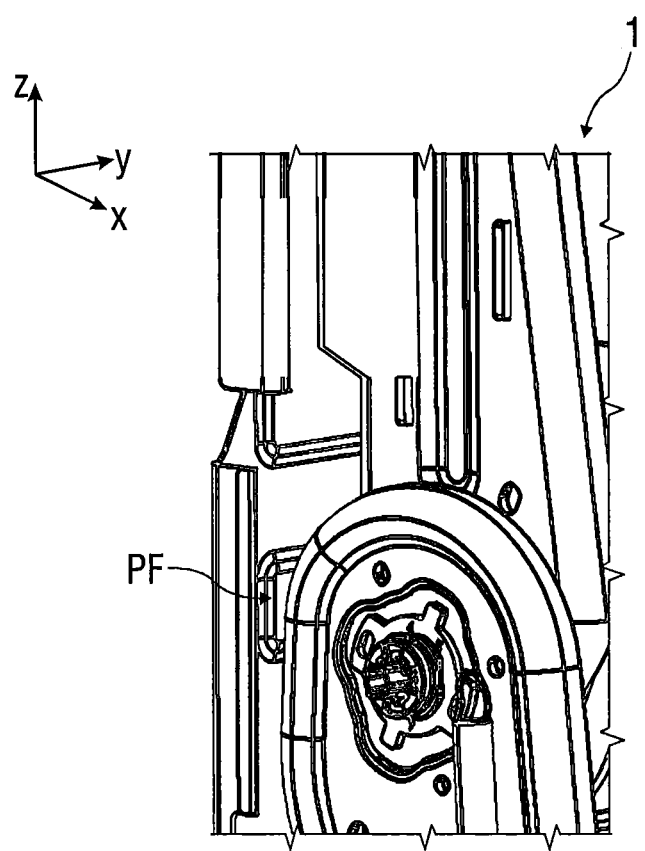
FIG. 17 shows a perspective view of an embodiment of a pivot fitting from an outboard side of a seat.

FIG. 17 shows a perspective view of an embodiment of a pivot fitting PF from an outboard side of a seat 1.

Figure 18A:
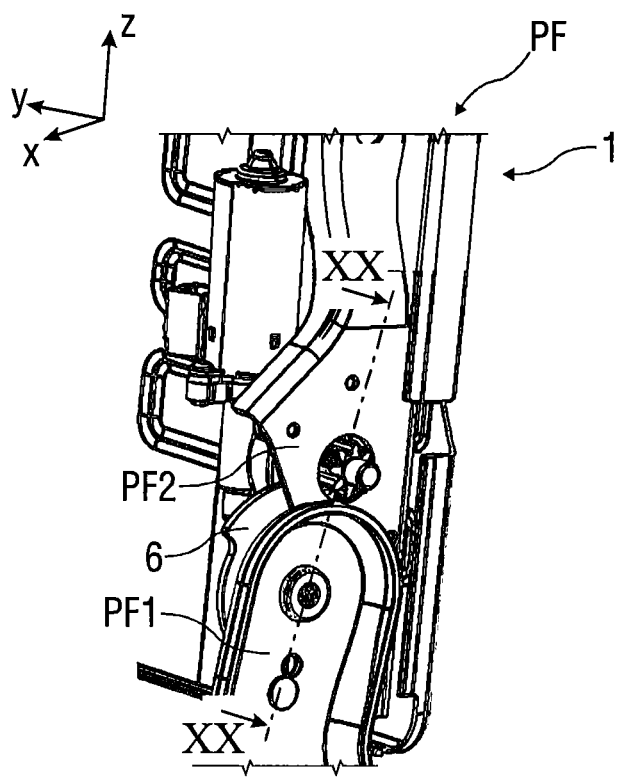
FIG. 18A shows a perspective view of an embodiment of a pivot fitting from an inboard side of a seat.
Figure 18B:
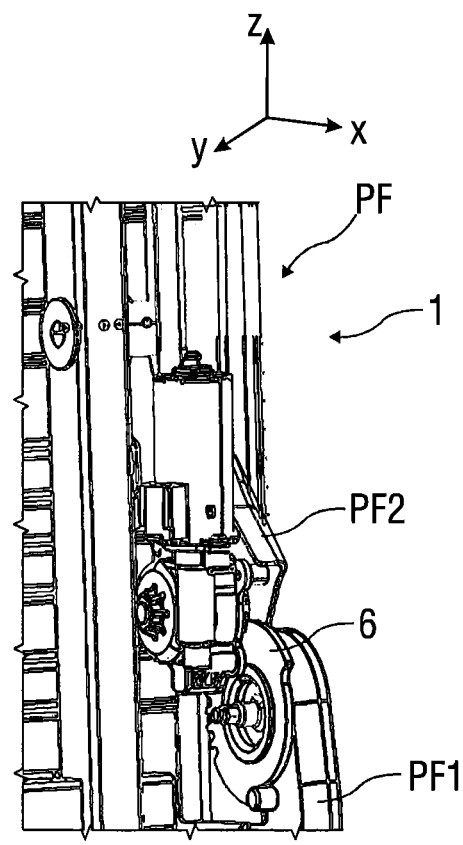
FIG. 18B shows a perspective view of an embodiment of a pivot fitting from an inboard side of a seat.

FIGS. 18A and 18B show perspective views of an embodiment of a pivot fitting PF from an inboard side of a seat 1.

Figure 19:
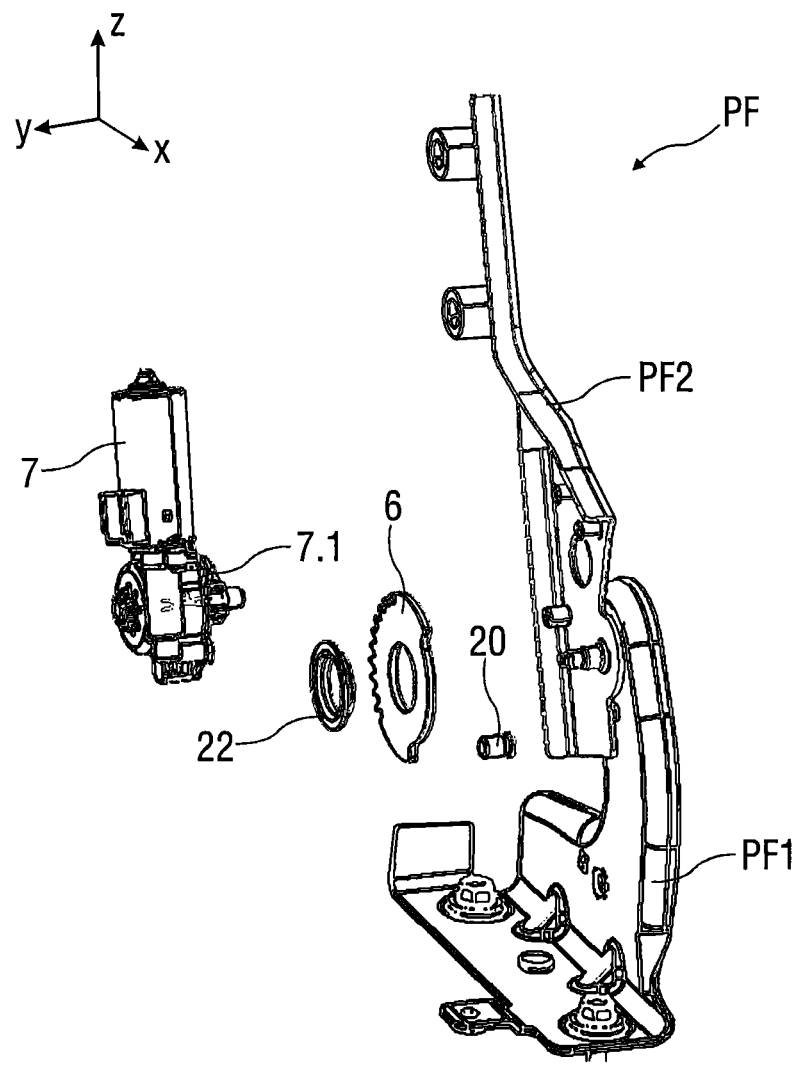
FIG. 19 shows an exploded view of the pivot fitting according to FIGS. 18A and 18B.

FIG. 19 shows an exploded view of the pivot fitting PF according to FIGS. 18A and 18B, wherein the stopper 20 is formed as a stop pin. The adjustment member 6 comprises a pivot bracket 22.

Figure 20:
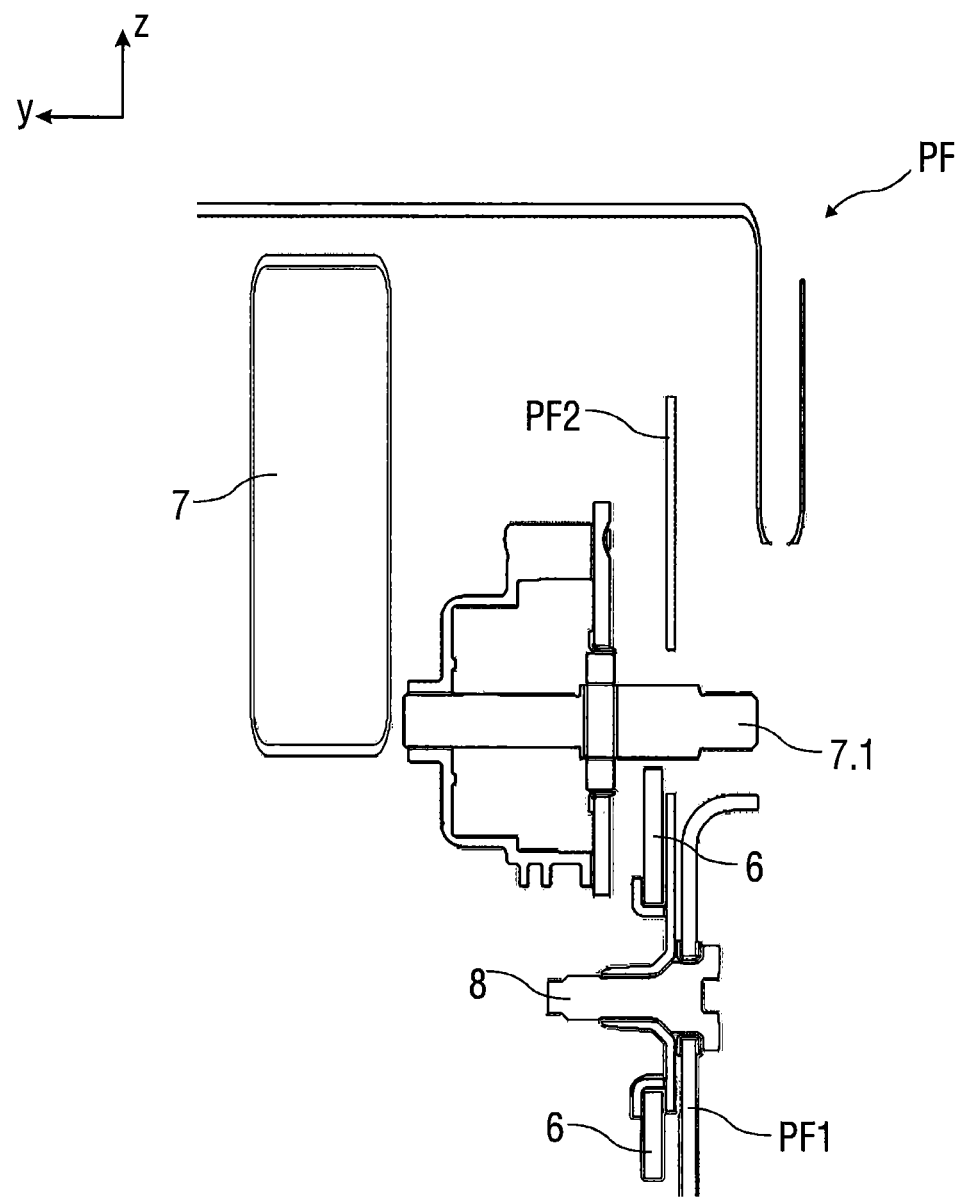
FIG. 20 shows a sectional view of the pivot fitting shown in FIG. 18A.

FIG. 20 shows a sectional view of the pivot fitting PF shown in FIG. 18A.

FIG. 21 shows schematically another embodiment of a pivot fitting PF comprising first and second fitting members PF1, PF2 and a free pivot and/or a second pivot fitting PF3. The pivot fitting PF is a manual discontinuous recliner, either single sided or dual sided with a cable release. A drive unit 7 is coupled to the pivot fitting PF at a motor drive interface. The drive unit 7 is connected to the second fitting member PF2 via a rotatable rod 23. The second fitting member PF2 comprises an opening 24 which comprises stoppers 20 configured to engage with the rod 23 such that depending on a movement direction of the rod 23, the rod 23 comes into contact with the stoppers 20 such that the second fitting member PF is pushed by the rod 23 and pivoted about a pivot axis PA.

FIG. 22 shows schematically an embodiment of pivot fitting components of the pivot fitting PF according to FIG. 21, wherein the second fitting member PF2 is in the upright use position P1. FIGS. 23A and 23B show schematically an embodiment of pivot fitting components of the pivot fitting PF in a motion sequence, wherein the back-rest 3, i.e. the second fitting member PF2, is moved from a non-use position P2 to an upright use position P1.

LIST OF REFERENCES 1 seat
1.1 seat structure
2 seat pan
3 back-rest
4 headrest
5 operation device
6 adjustment member
6.1 free swing segment
6.2 toothed segment
6.3 guide element
6.4, 6.5 contact surface
6.6 stop element
7 drive unit
7.1 pinion
8 pivot pin
9 calibration stop pin
10 lift bracket
11 mounting plate
12 fixation element
13 release lever
13.1 contacting area
14 switch element
14.1 tipping-point
15, 15' hard stop element
16 free swing gate
16.1 notch
16.2 guiding recess
17 flexible cable element
18 cable release lever
19 actuator pin
20 stopper
21 handle actuation mechanism
22 pivot bracket
23 rod
24 opening
25 torque coil spring
26 clock spring
27 driver element
28 cam element
29 control disk
30 clamping ring
AZ1 zone, in particular free swing zone
AZ2 zone, in particular comfort adjustment zone
CRM cable release mechanism
DD drive direction
FD folding direction
LD lift device
LM lock mechanism
LS locked state
P1 upright use position
P1.1 first lock position
P1.2 upright design position
P1.3 comfort use position
P2 non-use position
P3 initial position
P4 second position
P5 free swing position
P6 travel end position
PA pivot axis
PF pivot fitting
PF1 first fitting member
PF2 second fitting member
PF3 second pivot fitting
RD release direction
RH recliner heart
RM release mechanism
RS released state
S1, S2, S3 segment
S2.1 toothed portion
S3.1 toothed portion
SP segment portion
x longitudinal axis
y transverse axis
z vertical axis

What is claimed is:

1. A back-rest pivot fitting for a vehicle seat, the pivot fitting, comprising:
   a first fitting member which is mountable to a seat pan,
   a second fitting member which is pivotable coupled to the first fitting member and which is mountable to a back-rest, wherein the second fitting member is relatively adjustable with respect to the first fitting member,
   a recliner heart,
   an adjustment member which is rotatable coupled to the first and second fitting members, and
   a drive unit which is fixedly mounted to the first fitting member and configured to drive the adjustment member,
   wherein the recliner heart, when actuated, is configured to allow an unimpeded motion of the second fitting member relative to the first fitting member from an upright use position to a non-use position of the back-rest, and the adjustment member, when actuated, is configured to interact with the drive unit such that, when the drive unit is actuated, the second fitting member is moved from the non-use position to the upright use position, wherein the recliner heart comprises at least one free swing gate which is configured to allow the unimpeded motion of the second fitting member relative to the first fitting member when the recliner heart is in a released state.

2. The back-rest pivot fitting according to claim 1, wherein the drive unit comprises a drivable pinion which is coupled to a toothed segment of the adjustment member.

3. The back-rest pivot fitting according to claim 1, wherein the recliner heart comprises a fixed segment fixed to the first fitting member and a rotatable segment which is fixed to the second fitting member, wherein in a locked state of the recliner heart, the segments are in locked engagement.

4. The back-rest pivot fitting according to claim 3, wherein actuation of the recliner heart initiates disengagement of the rotatable segment from the fixed segment via intermediate segments provided between the fixed segment and the rotatable segment.

5. The back-rest pivot fitting according to claim 4, wherein the intermediate segments each comprises a segment portion and a toothed portion, wherein in a locked state of the recliner heart a respective segment portion is located in a notch of the free swing gate and allows the respective toothed portion to engage the rotatable segment and in a released state the respective segment portion is located on a surface of a guiding recess of the free swing gate such that the respective toothed portion is held disengaged from the rotatable segment.

6. The back-rest pivot fitting according to claim 1, wherein, when the back-rest is positioned in the upright use position and the pivot fitting is in a locked state, the adjustment member is positioned in an initial position.

7. The back-rest pivot fitting according to claim 6, wherein upon releasing the second fitting member to be pivoted from the upright use position to the non-use position, the adjustment member is configured to remain in the initial position, wherein when actuating the drive unit the adjustment member is configured to be driven from the initial position to a second position to actively adjust the second fitting member from the non-use position to the upright use position.

8. The back-rest pivot fitting according to claim 1, wherein the second fitting member comprises a lift bracket to be contacted by the adjustment member when adjusting the second fitting member from the non-use position to the upright use position.

9. The back-rest pivot fitting according to claim 8, wherein the lift bracket is arranged on a rear side of the second fitting member.

10. The back-rest pivot fitting according to claim 9, wherein the adjustment member comprises a stop element which, when the drive unit is actuated, comes in contact with the lift bracket to push the second fitting member from the non-use position to the upright use position.

11. The back-rest pivot fitting according to claim 6, wherein, when the second fitting member is moved and locked in the upright use position, the drive unit is configured to drive the adjustment member back to the initial position.

12. A seat for a vehicle, comprising:
the seat pan,
the folding back-rest which is pivotable coupled to the seat pan,
the pivot fitting for adjusting a pivoting of the back-rest relative to the seat pan between at least the upright use position and at least the non-use position, and
the back-rest pivot fitting for adjusting a pivoting of the back-rest relative to the seat pan between at least an upright use position and at least a non-use position according to claim 1.

* * * * *